United States Patent
Kimura et al.

(10) Patent No.: US 9,866,385 B2
(45) Date of Patent: Jan. 9, 2018

(54) DELIVERY SYSTEM, DELIVERY METHOD, AND DELIVERY PROGRAM

(71) Applicant: FUJITSU LIMITED, Kawasaki-shi, Kanagawa (JP)

(72) Inventors: Masako Kimura, Yokohama (JP); Yusuke Nomiyama, Ota (JP); Hideaki Kawano, Kamakura (JP); Shinobu Wakabayashi, Odawara (JP); Atsushi Miura, Morioka (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 15/045,500

(22) Filed: Feb. 17, 2016

(65) Prior Publication Data
US 2016/0269180 A1 Sep. 15, 2016

(30) Foreign Application Priority Data
Mar. 9, 2015 (JP) .................................. 2015-046483

(51) Int. Cl.
H04L 9/32 (2006.01)
H04W 4/00 (2009.01)

(52) U.S. Cl.
CPC .............. *H04L 9/32* (2013.01); *H04W 4/008* (2013.01)

(58) Field of Classification Search
CPC .................................. H04L 9/32; H04W 4/008
USPC ........................................................ 713/168
See application file for complete search history.

(56) References Cited

U.S. PATENT DOCUMENTS

| 6,618,396 B1* | 9/2003 | Kondo ............. H04L 12/40058 370/474 |
| 2002/0003881 A1 | 1/2002 | Reitmeier et al. |
| 2013/0282926 A1* | 10/2013 | Chang .................. G06F 13/385 710/4 |
| 2015/0312725 A1 | 10/2015 | Torii |

FOREIGN PATENT DOCUMENTS

| JP | 2006-14197 | 1/2006 |
| JP | 2010-176691 | 8/2010 |
| WO | WO 2014/097968 A1 | 6/2014 |

OTHER PUBLICATIONS

Korean Office Action dated Jan. 4, 2017 in corresponding Korean Patent Application No. 10-2016-0025076.

* cited by examiner

*Primary Examiner* — Mohammad W Reza
(74) *Attorney, Agent, or Firm* — Staas & Halsey LLP

(57) ABSTRACT

A delivery system includes a first terminal device and a delivery device, wherein the delivery device includes a division unit configured to divide delivery information by delivery size to generate a plurality of pieces of divided information and a delivery unit configured to sequentially deliver the plurality of pieces of divided information, and the first terminal device includes a reception unit configured to receive the plurality of pieces of divided information and a coupling unit configured to couple the plurality of pieces of divided information to generate the delivery information.

10 Claims, 35 Drawing Sheets

FIG. 4A

| UNIT: byte | 1 | 1 | 1 | 1 | 32 | 1 | 64 | 1 | 132 |
|---|---|---|---|---|---|---|---|---|---|
| | CONTROL ADDRESS | DISTANCE CONDITION | SIGNAL INTENSITY | SIZE(1) | WIRELESS LAN CONNECTION (SSID) | SIZE(2) | WIRELESS LAN CONNECTION (SECURITY KEY) | SIZE(3) | STRING (URL) |
| | | | | | 32 CHARACTERS (SINGLE-BYTE ALPHANUMERIC SYMBOL) | | 64 CHARACTERS (SINGLE-BYTE ALPHANUMERIC SYMBOL) | | 132 CHARACTERS (SINGLE-BYTE ALPHANUMERIC SYMBOL) |

| UNIT: bit | 8 | 8 | 8 |
|---|---|---|---|
| | CONTROL ADDRESS (BEHAVIOR OF APP) | DISTANCE CONDITION (REFERENCE 1 m) | SIGNAL INTENSITY (measured power) |
| | 0/1×8 (Max256) | UNLIMITED/EQUAL OR LONGER/ SHORTER/PROXIMATE | Hex (Max255) |

FIG. 4B

| UNIT: byte | | |
|---|---|---|
| 1 | CONTROL ADDRESS | |
| 1 | DISTANCE CONDITION | |
| 1 | SIGNAL INTENSITY | |
| 1 | SIZE | |
| 230 | STRING (URL) (230 CHARACTERS (SINGLE-BYTE ALPHANUMERIC SYMBOL)) | |

| UNIT: bit | | |
|---|---|---|
| 8 | CONTROL ADDRESS (BEHAVIOR OF APP) | 0/1×8 (Max256) |
| 8 | DISTANCE CONDITION (REFERENCE 1 m) | UNLIMITED/EQUAL OR LONGER/ SHORTER/PROXIMATE |
| 8 | SIGNAL INTENSITY (measured power) | Hex (Max255) |

FIG. 4C

| UNIT: byte | | | | |
|---|---|---|---|---|
| 1 | 1 | 1 | 30 | 199 |
| CONTROL ADDRESS | DISTANCE CONDITION | SIGNAL INTENSITY | SIZE(1) | STRING (TITLE) | SIZE(2) | STRING (MESSAGE) |

MAXIMUM DOUBLE-BYTE 10 CHARACTERS (DOUBLE-BYTE/SINGLE-BYTE ALPHANUMERIC SYMBOL)

MAXIMUM DOUBLE-BYTE 66 CHARACTERS (DOUBLE-BYTE/SINGLE-BYTE ALPHANUMERIC SYMBOL)

| UNIT: bit | | |
|---|---|---|
| 8 | 8 | 8 |
| CONTROL ADDRESS (BEHAVIOR OF APP) | DISTANCE CONDITION (REFERENCE 1 m) | SIGNAL INTENSITY (measured power) |
| 0/1×8 (Max256) | UNLIMITED/EQUAL OR LONGER/ SHORTER/PROXIMATE | Hex (Max255) |

FIG. 4D

UNIT: byte

| 1 | 1 | 1 | 2 | 2 | 2 |
|---|---|---|---|---|---|
| CONTROL ADDRESS | DISTANCE CONDITION | SIGNAL INTENSITY | FIRST LAYER ID (EXAMPLE: BRANCH ID) | SECOND LAYER ID (EXAMPLE: FLOOR ID) | THIRD LAYER ID (EXAMPLE: SHELF ID) |
|   |   |   | Hex (Max65534) | Hex (Max65534) | Hex (Max65534) |

UNIT: bit

| 8 | 8 | 8 |
|---|---|---|
| CONTROL ADDRESS (BEHAVIOR OF APP) | DISTANCE CONDITION (REFERENCE 1 m) | SIGNAL INTENSITY (measured power) |
| 0/1×8 (Max256) | UNLIMITED/EQUAL OR LONGER/ SHORTER/PROXIMATE | Hex (Max255) |

FIG. 4E

UNIT: byte

| 234 |
|---|
| Free format |
| Hex |

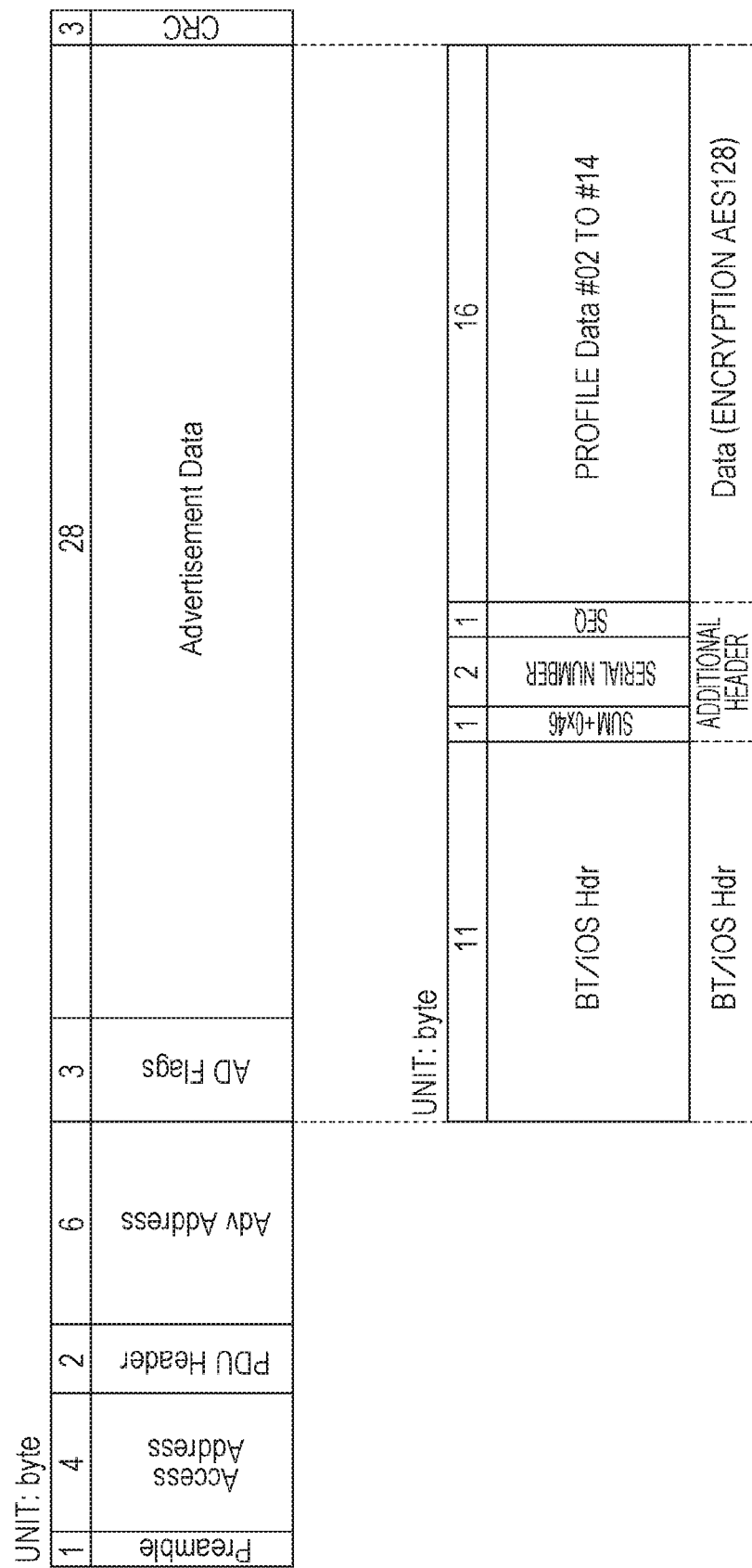

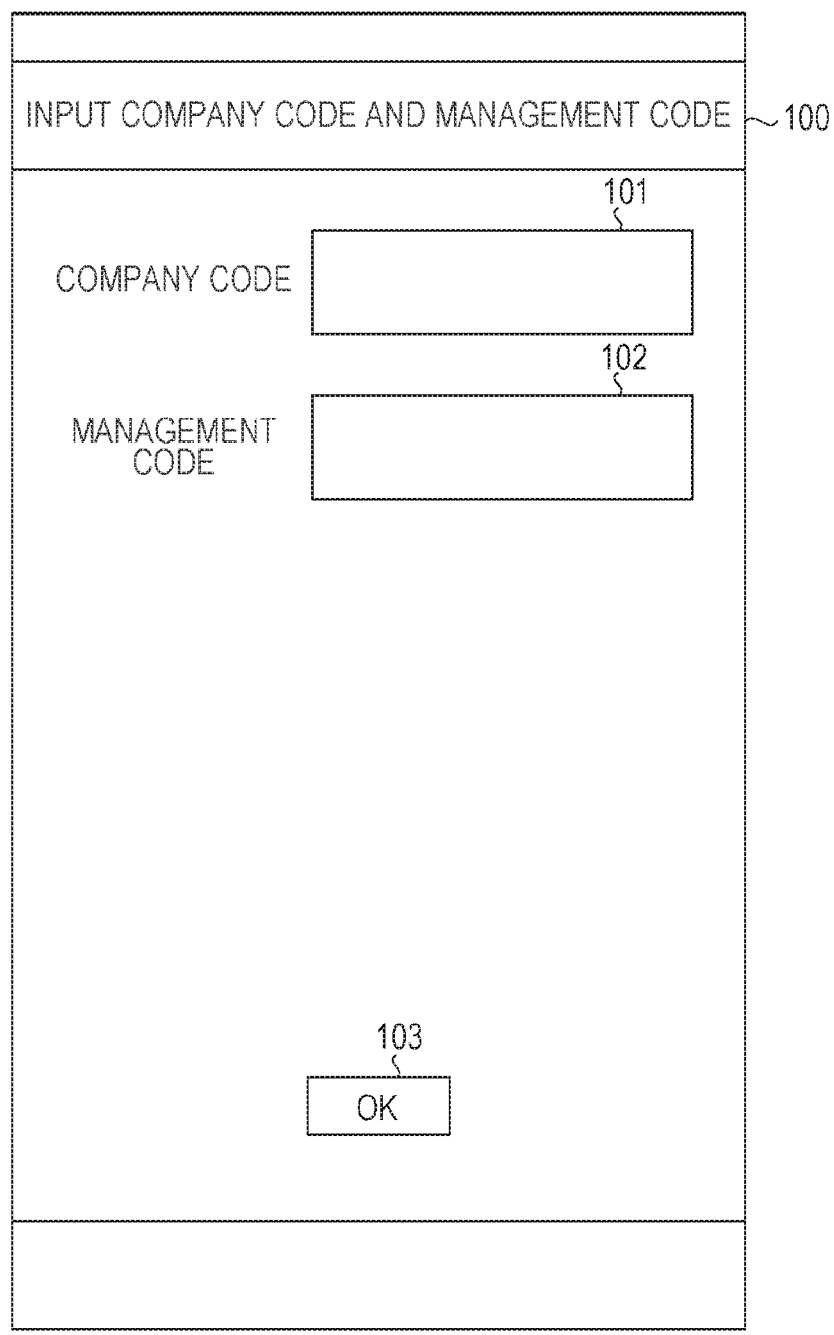

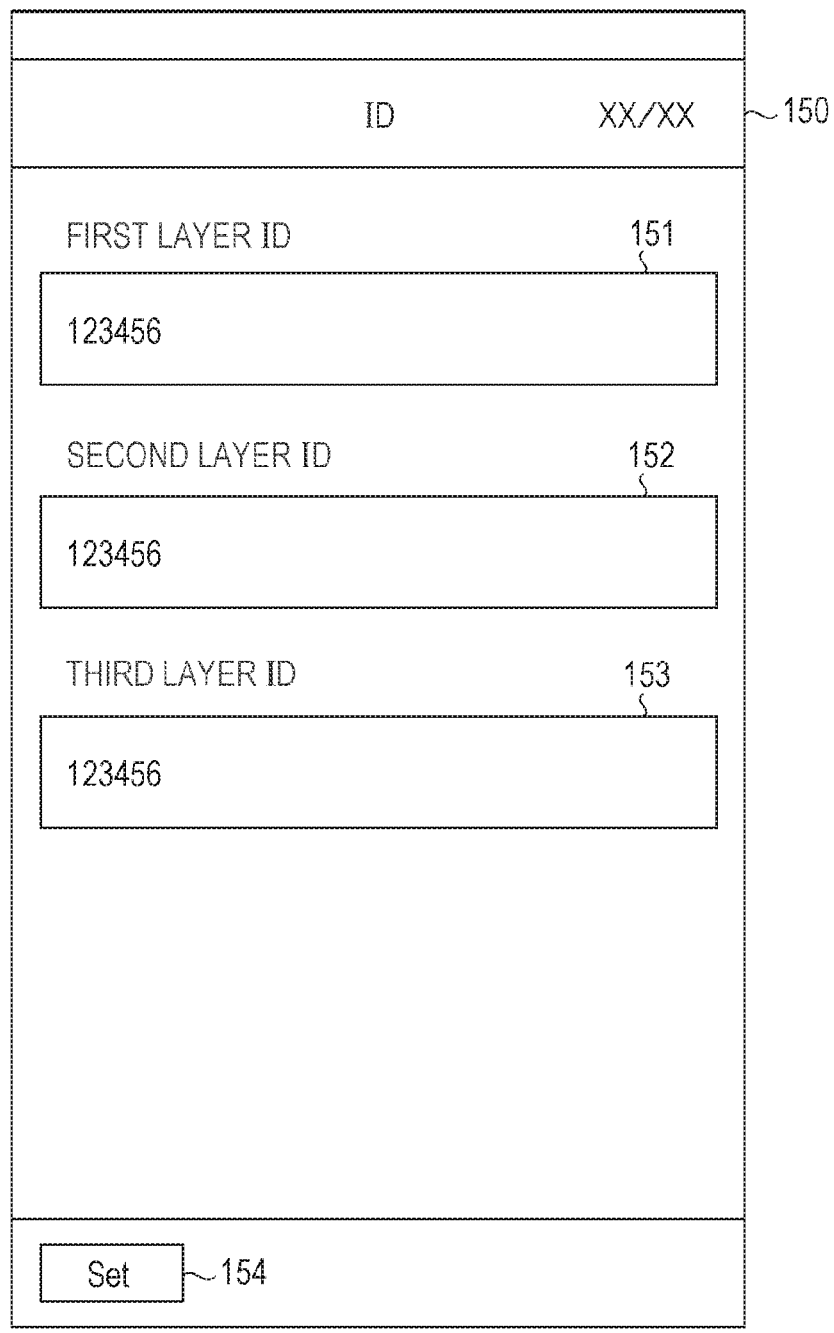

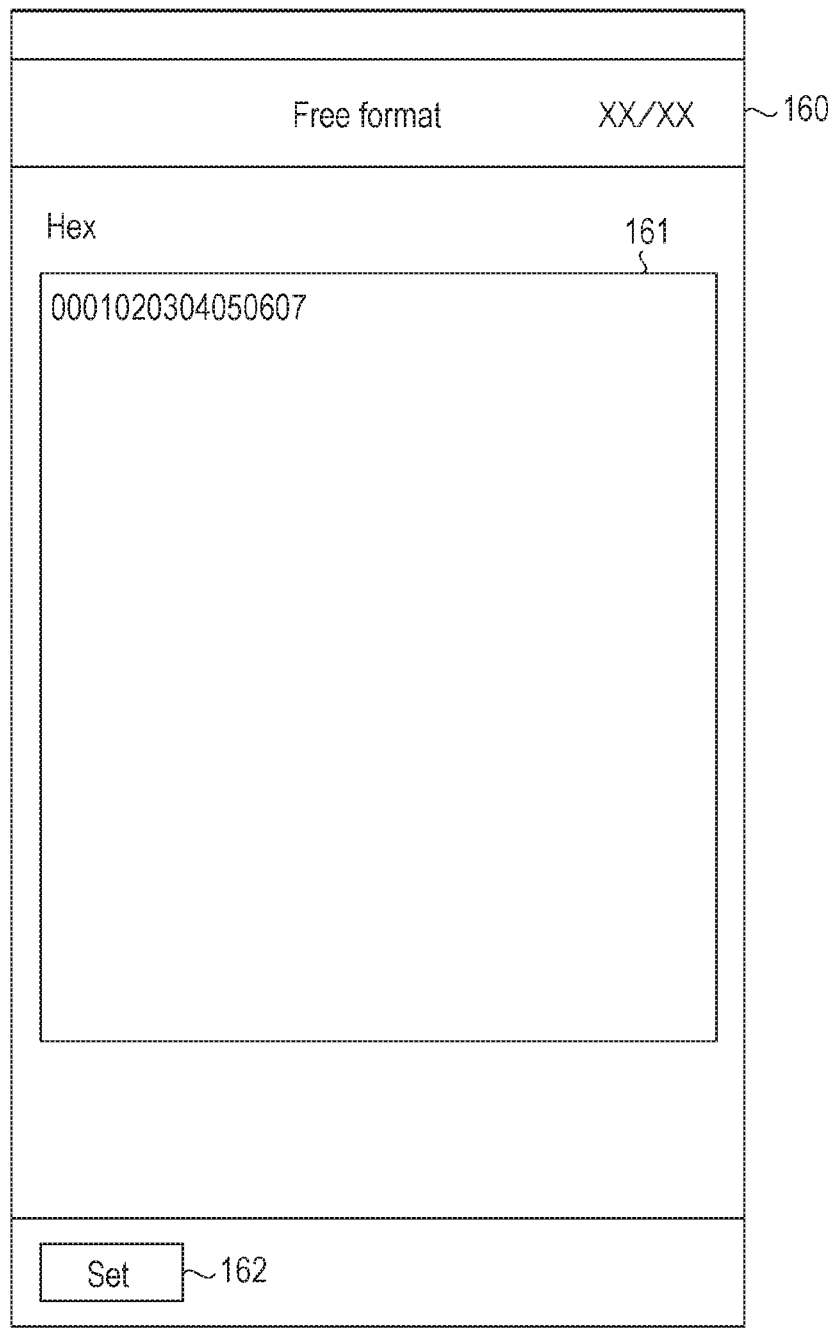

FIG. 8G

| | | |
|---|---|---|
| MANAGEMENT SETTING XX/XX | | ~170 |
| MANAGEMENT CODE | 0 | ~171 |
| PACKET TRANSMISSION CYCLE | 100 | ~172 |
| PACKET SWITCHING CYCLE | 200 | ~173 |
| CONTROL ADDRESS | 00000011 | ~174 |
| DISTANCE CONDITION | 1 m OR LONGER | ~175 |
| SIGNAL INTENSITY | 80 | ~176 |

Set ~177

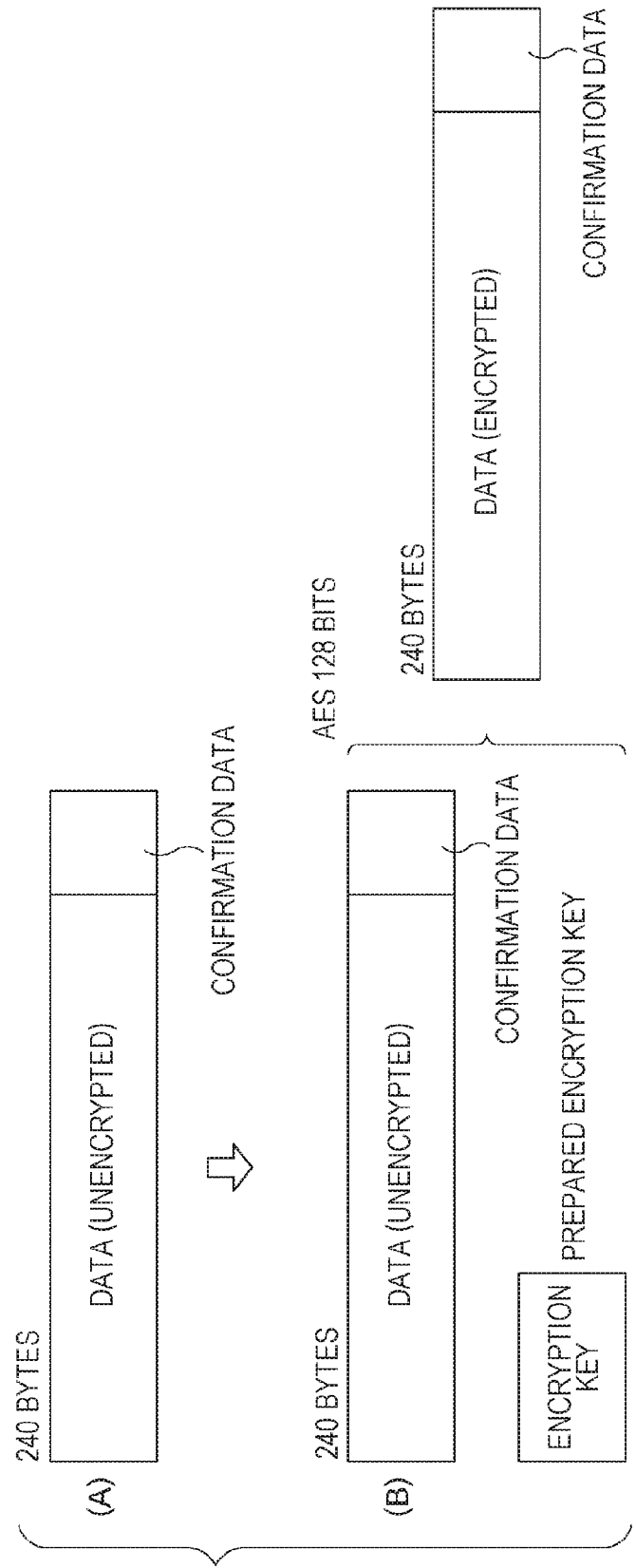

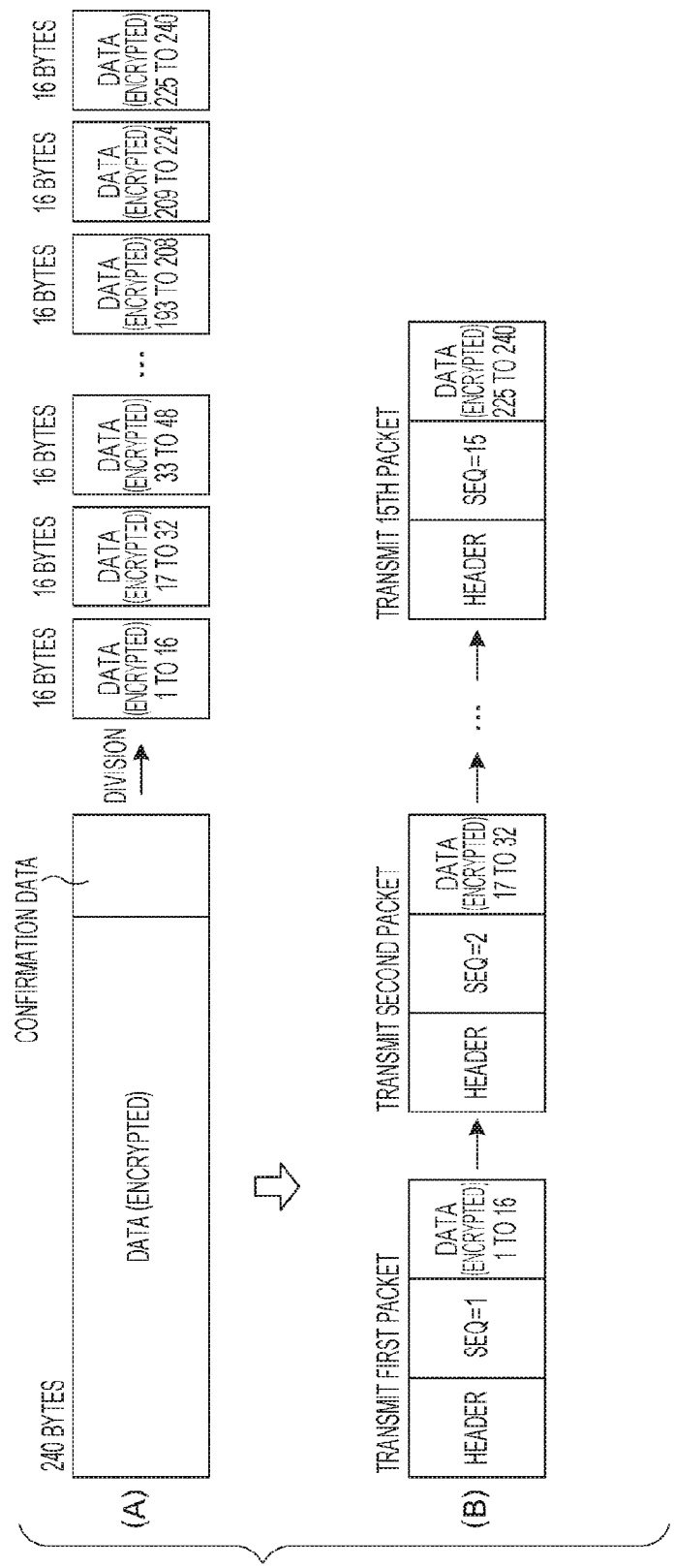

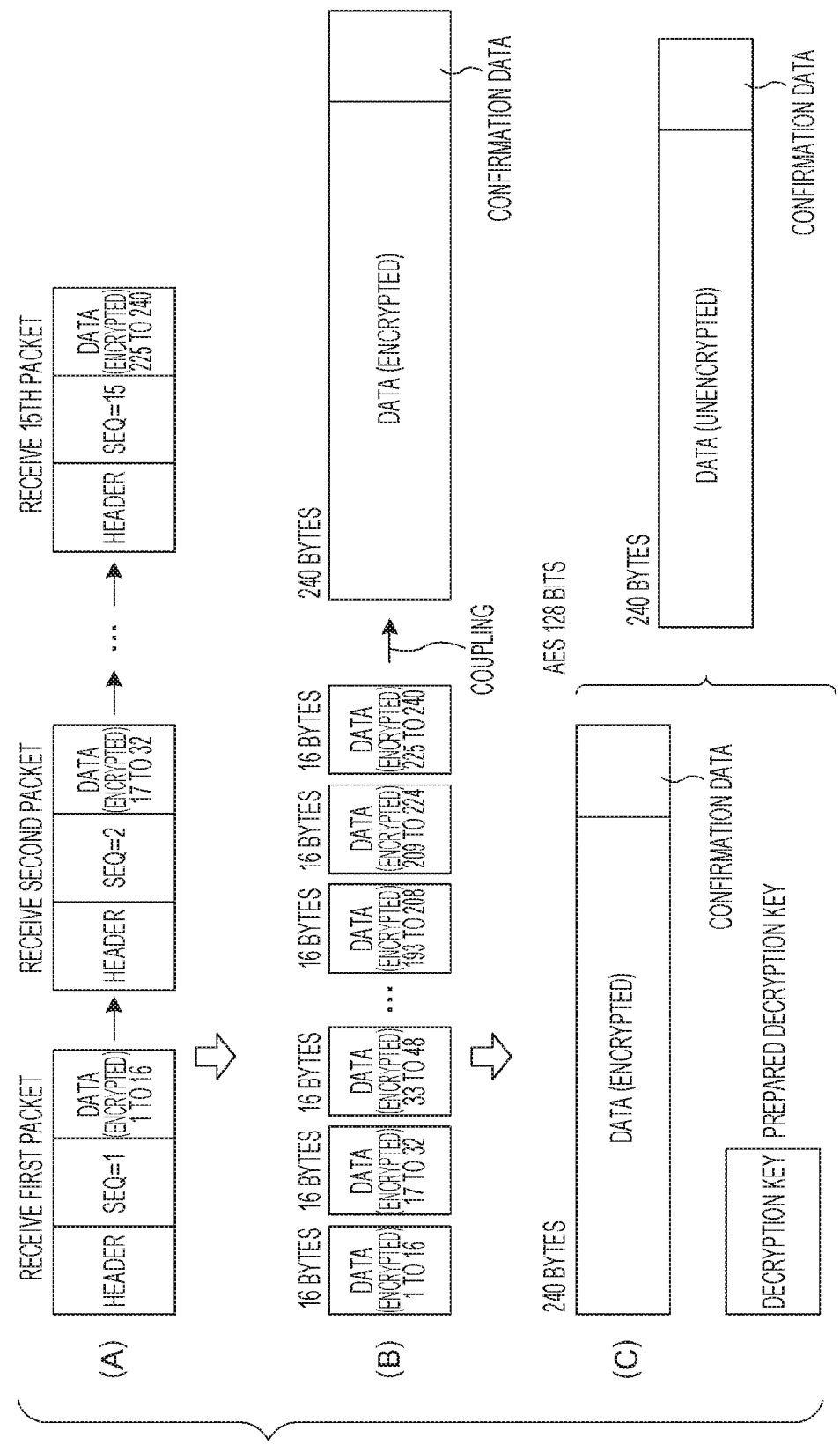

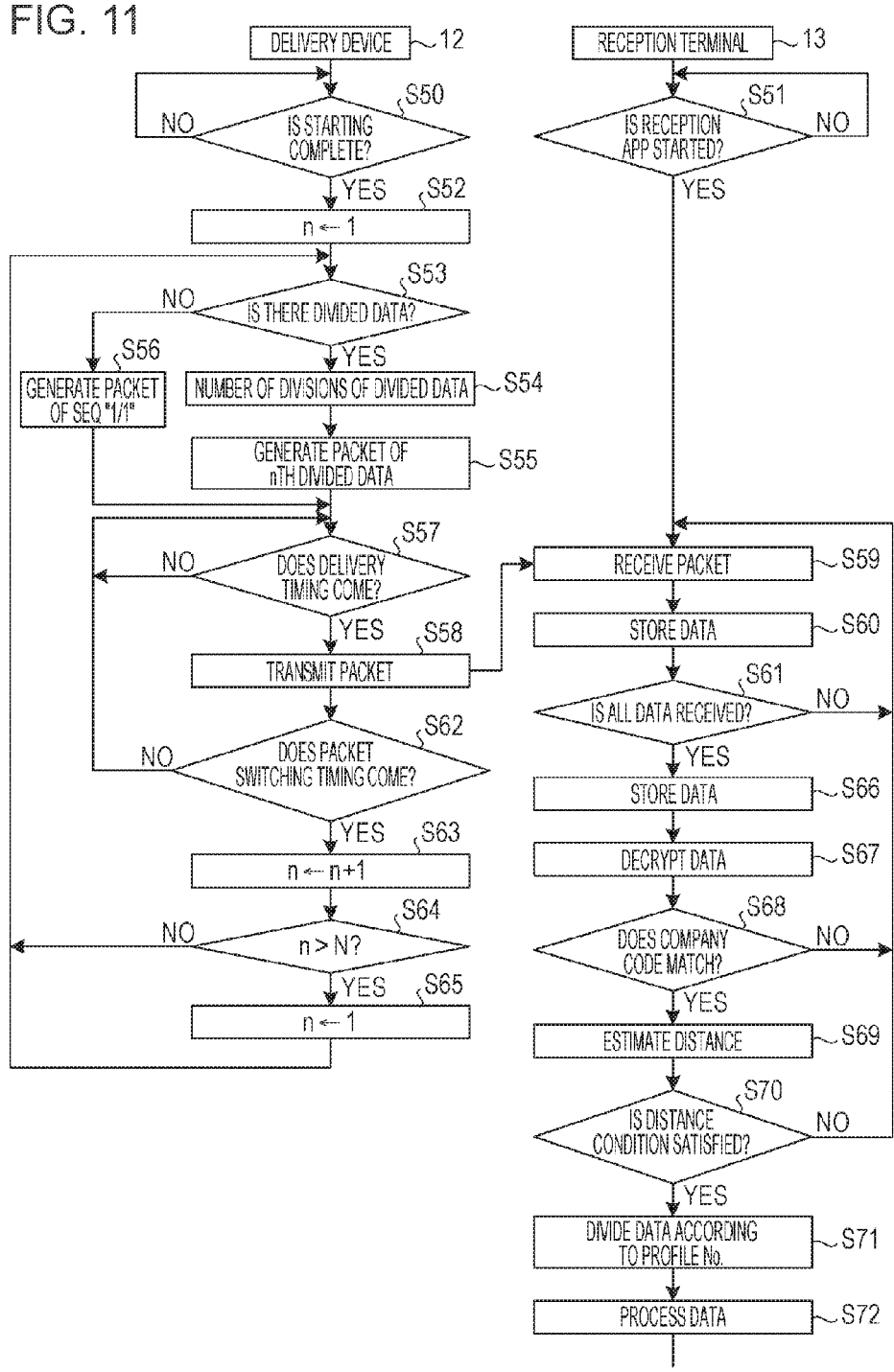

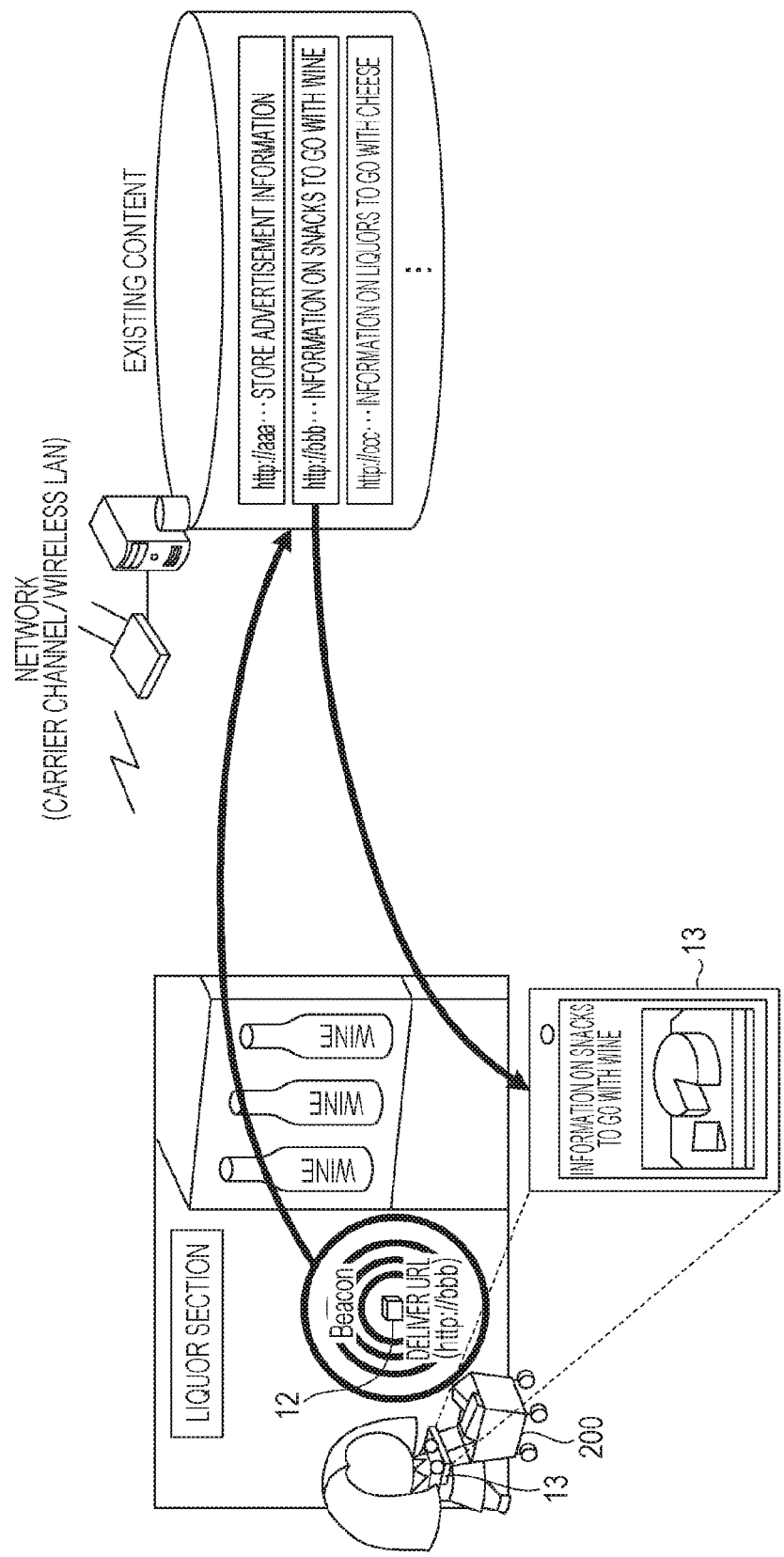

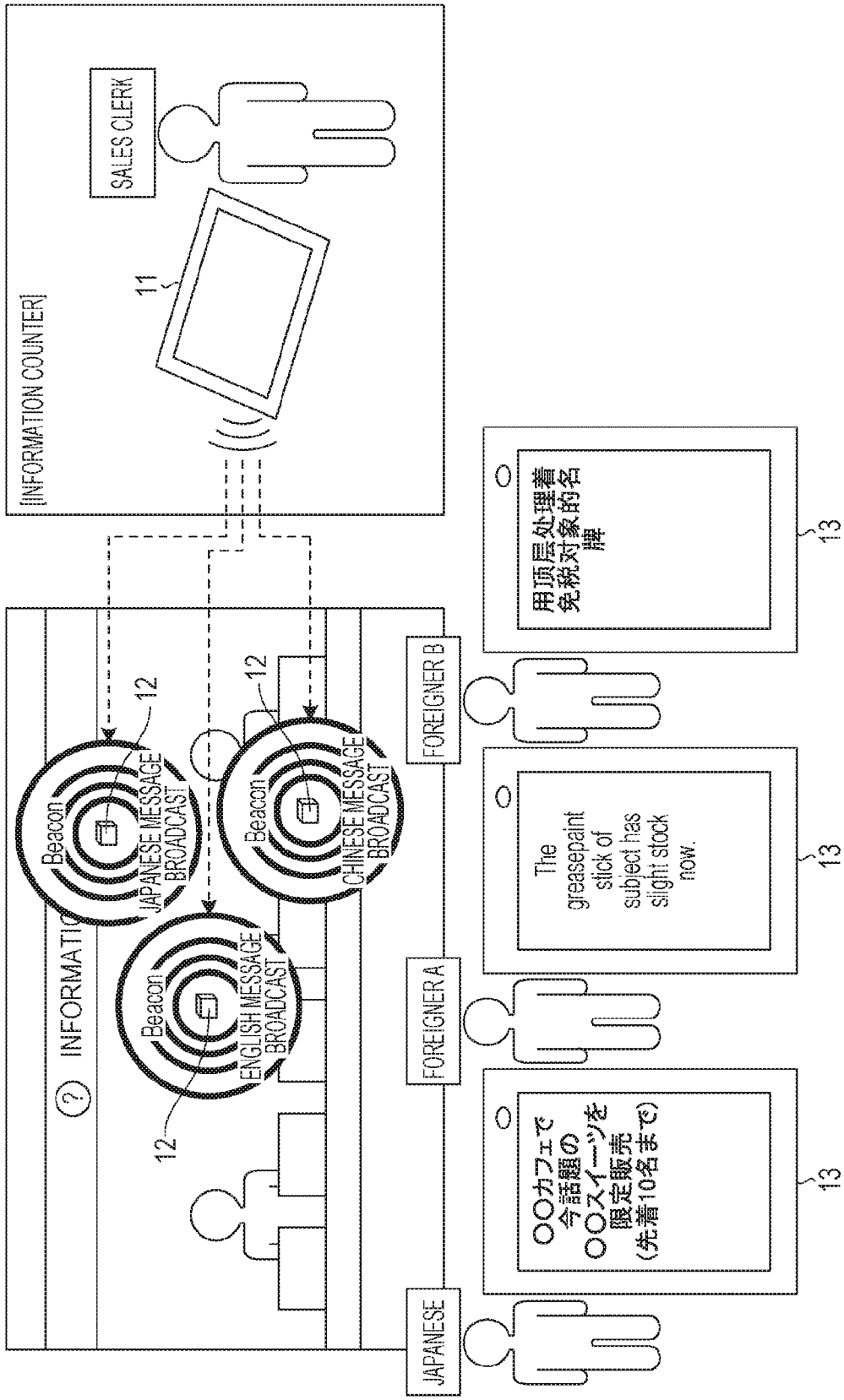

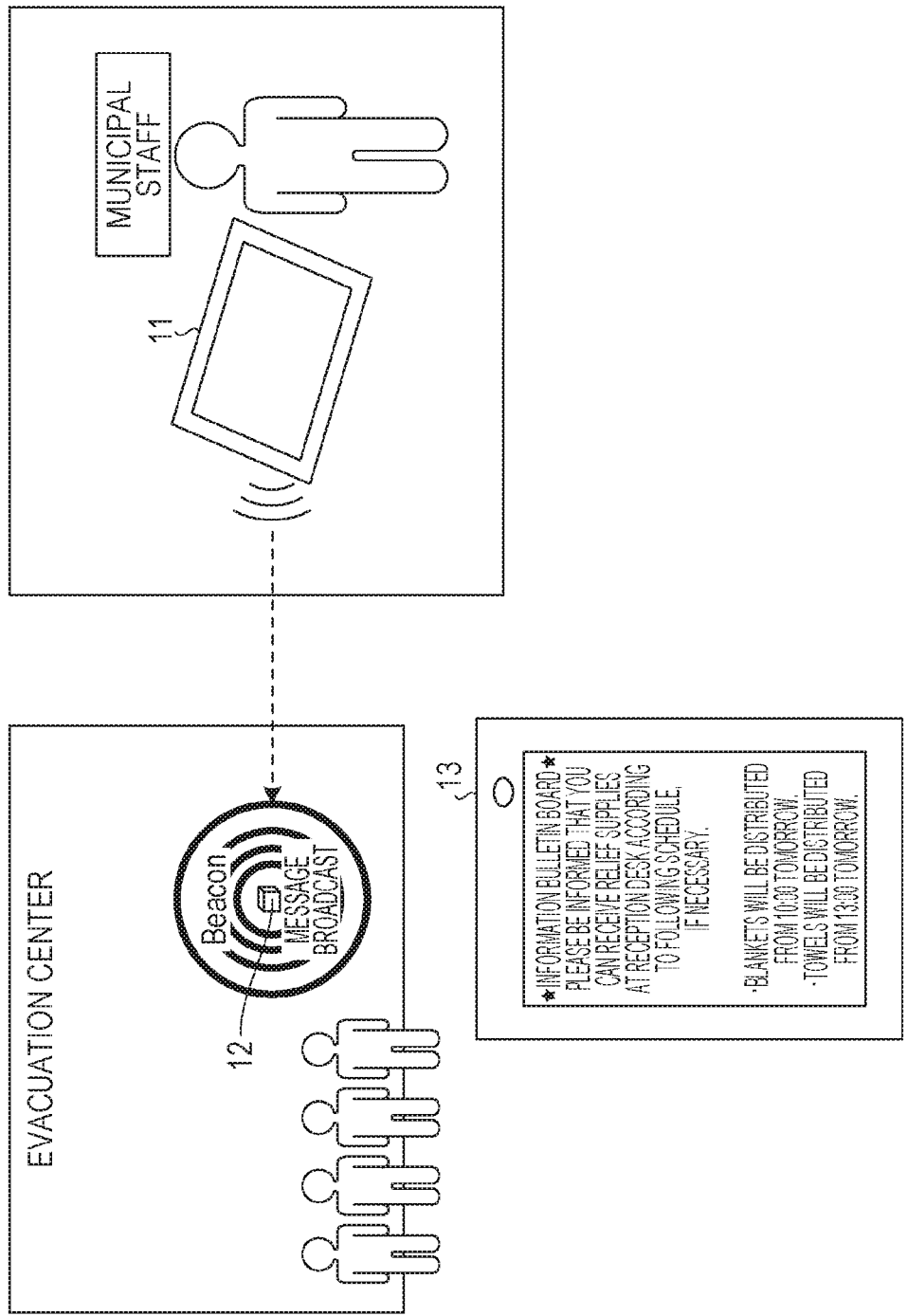

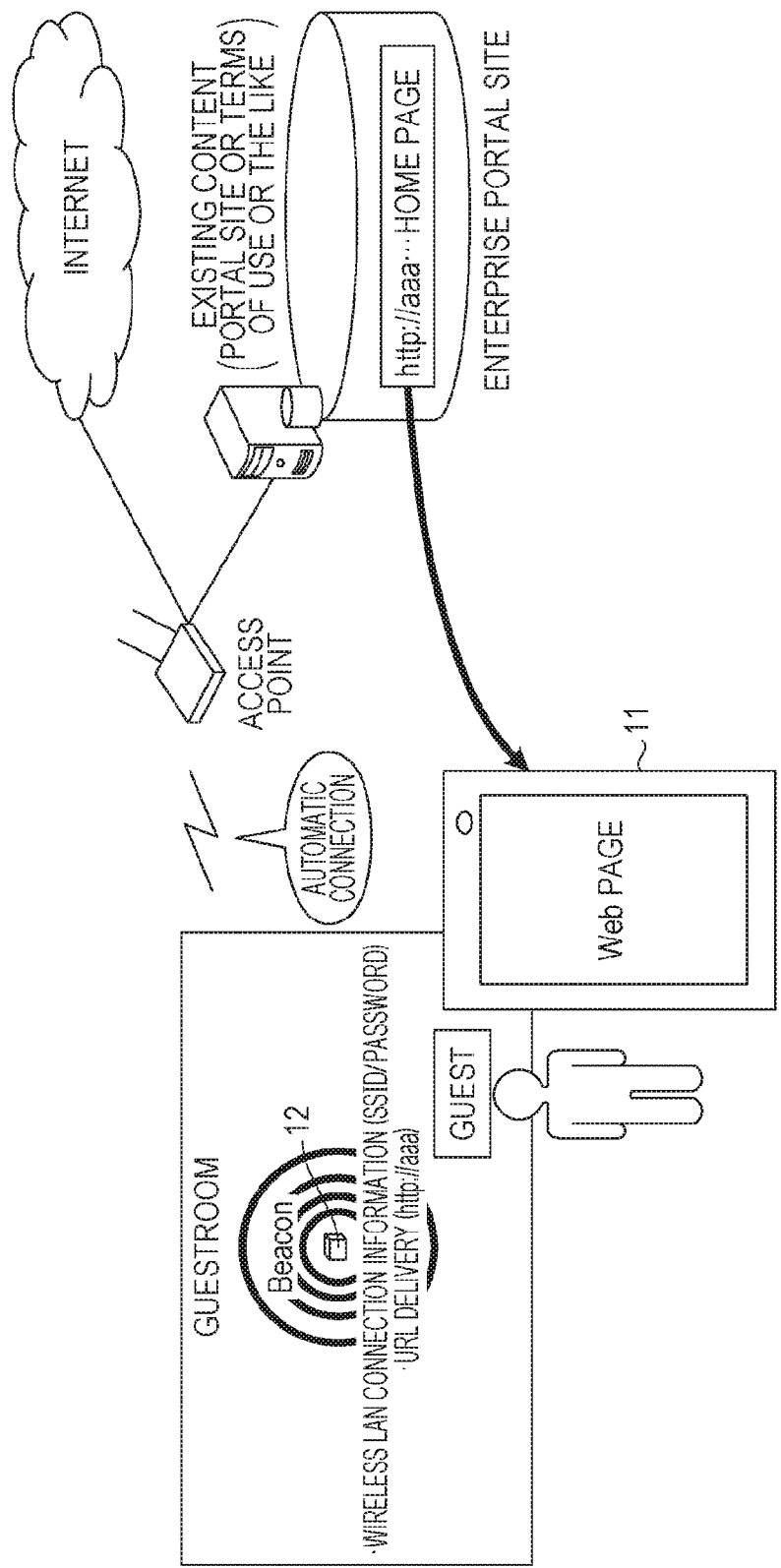

DELIVERY SYSTEM, DELIVERY METHOD, AND DELIVERY PROGRAM

CROSS-REFERENCE TO RELATED APPLICATION

This application is based upon and claims the benefit of priority of the prior Japanese Patent Application No. 2015-046483, filed on Mar. 9, 2015, the entire contents of which are incorporated herein by reference.

FIELD

The embodiments discussed herein are related to a delivery system, a delivery method, and a delivery program.

BACKGROUND

In recent years, Bluetooth (registered trademark) Low Energy (hereinafter also referred to as "BLE") advertising has been known as a technique to deliver information to a terminal device such as a smart phone, or the like. The packet size for a communication method of the BLE advertising is as small as approximately 30 bytes. For this reason, the communication method of the BLE advertising is mainly used for delivery of code information such as an ID (identification). International Publication Pamphlet No. WO2014/097968 discloses a mechanism by which a transmitter delivers an ID, and a terminal that receives the ID makes an inquiry to a management device configured to manage IDs.

If a management device is prepared as disclosed in International Publication Pamphlet No. WO2014/097968, the management device may manage information tied to each ID, which thus makes it possible to easily increase information to be delivered to a terminal. However, if the terminal makes an inquiry about an application tied to an ID as disclosed in International Patent Publication No. WO 2014/097968, useless communications to the management device occur every time the terminal receives an ID tied to an application that is not installed in the terminal. Thus, whenever a terminal held by an end user approaches to the foregoing transmitter that transmits the ID, useless communications occur, and the frequent occurrence of communications with non-executable applications causes a problem that communication traffic and terminal batteries are uselessly consumed. In addition, in the case of building a small-scale delivery system, preparation of a management device makes costs for facility and operation largely allocated to the management device, and limits a range of businesses that may be introduced.

In one aspect, an objective is to provide a delivery system, a delivery method, and a delivery program that are enabled to directly provide usable information without being provided with a management system.

SUMMARY

According to an aspect of the invention, a delivery system includes a first terminal device and a delivery device, wherein the delivery device includes a division unit configured to divide delivery information by delivery size to generate a plurality of pieces of divided information and a delivery unit configured to sequentially deliver the plurality of pieces of divided information, and the first terminal device includes a reception unit configured to receive the plurality of pieces of divided information and a coupling unit configured to couple the plurality of pieces of divided information to generate the delivery information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of a data format of Profile No: 01;

FIG. 4B is a diagram illustrating an example of a data format of Profile No: 02;

FIG. 4C is a diagram illustrating an example of a data format of Profile No: 03;

FIG. 4D is a diagram illustrating an example of a data format of Profile No: 04;

FIG. 4E is a diagram illustrating an example of a data format of Profile No: 15;

FIG. 5 is a diagram illustrating an example of a packet format;

FIG. 6A is a diagram illustrating an example of a packet format;

FIG. 6B is a diagram illustrating an example of a packet format;

FIG. 7 is a diagram illustrating an example of a screen for inputting a company code and a management code;

FIG. 8E is a diagram illustrating an example of a setting change screen related to an ID;

FIG. 8F is a diagram illustrating an example of setting change screen of data in a free format;

FIG. 8G is a diagram illustrating an example of a setting change screen for performing management setting;

FIG. 9A is a diagram illustrating flow of encryption;

FIG. 9B is a diagram illustrating division of delivery information and flow of delivery;

FIG. 9C is a diagram illustrating flow of coupling and decryption of received data;

FIG. 11 is a sequence diagram illustrating flow of a delivery process that delivers information and of a decryption process that decrypts delivered information;

FIG. 12A is a diagram illustrating an example in which a delivery system is applied;

FIG. 12D is a diagram illustrating another example in which the delivery system is applied;

FIG. 12E is a diagram illustrating another example in which the delivery system is applied;

FIG. 12F is a diagram illustrating another example in which the delivery system is applied;

DESCRIPTION OF EMBODIMENTS

Embodiments of a delivery system, a delivery method, a setting program, a delivery program, and a decryption program according to the disclosure are hereinafter described in detail with reference to the drawings. Note that the disclosure shall not be limited to these embodiments. Then, the embodiments may be combined appropriately without causing contradiction in the processing contents. In the embodiments, Bluetooth (registered trademark) in earlier standard not yet supporting BLE is referred to as "Bluetooth (registered trademark) Classic".

Embodiment 1

System Configuration

Figure 1:
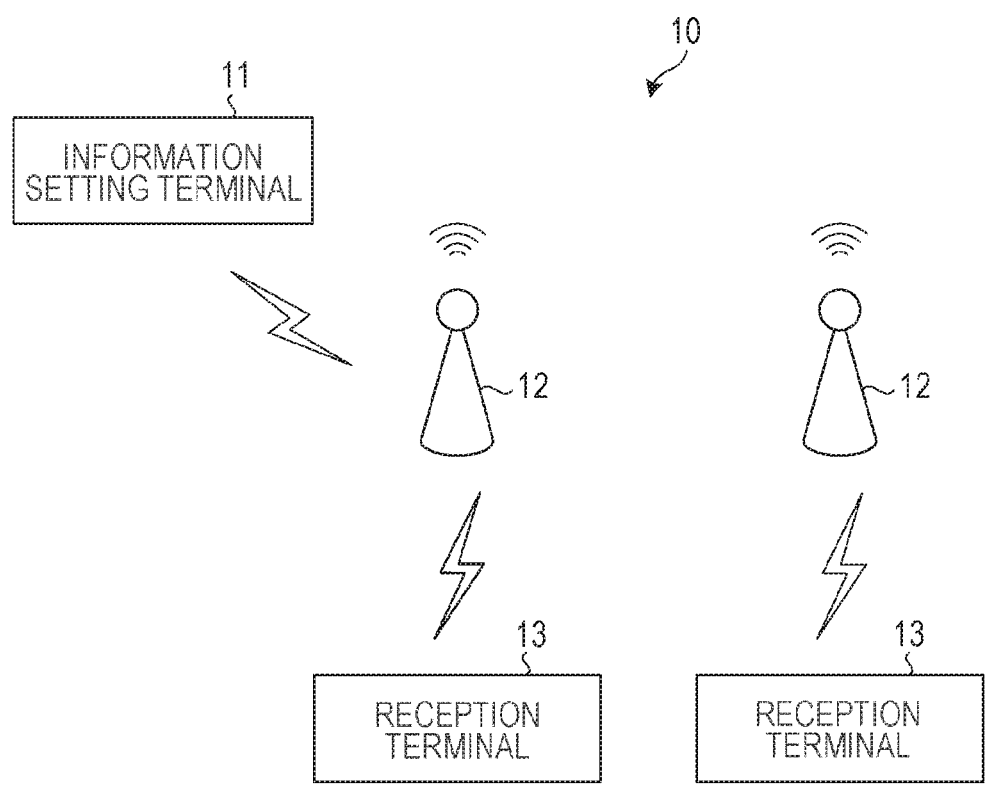
FIG. 1 is a diagram illustrating an example of a delivery system configuration.

First, an example of a delivery system configured to deliver information is described. FIG. 1 is a diagram illustrating an example of a delivery system configuration. As illustrated in FIG. 1, a delivery system 10 has an information setting terminal 11, multiple delivery devices 12, and multiple reception terminals 13. Note that while two each of delivery devices 12 and multiple reception terminals 13 are illustrated in the example of FIG. 1, there may be any number of the delivery devices 12 and the reception terminals 13, respectively. In addition, in the example of FIG. 1, while a case where there is one information setting terminal is illustrated, the configuration is not limited to this and an information setting terminal 11 may be in any number.

The delivery system 10 is a system configured to deliver various types of information through wireless communications. For example, the delivery system 10 delivers various types of information from the delivery device 12 via BLE. Various types of portable devices such as a smart phone and a tablet terminal support BLE. For example, iOS in versions 7 and later of Apple (registered trademark) supports iBeacon (registered trademark) that utilizes BLE. In addition, Android (registered trademark) in versions 4.3 and later supports BLE.

The information setting terminal 11 is a terminal device configured to set delivery information to be delivered by the delivery device 12. For example, the information setting terminal 11 is an information processing device such as a smart phone, a tablet terminal, or a personal computer owned by a manager who manages delivery of data. The information setting terminal 11 accepts input of target delivery information from the manager and sets the accepted information to the delivery device 12. In the embodiment, the information setting terminal 11 corresponds to a first terminal device.

The delivery device 12 is a device configured to wirelessly deliver information. For example, the delivery device 12 is a wireless device such as a beacon device supporting BLE, which cyclically delivers information to a predetermined range through near field communication. BLE is considered capable of delivery of information to a range from a few meters to approximately 50 meters, for example. BLE consumes smaller currents while transmitting. Thus, it is considered possible that the delivery device 12 may be driven for a long period of time with a small battery. The delivery device 12 delivers information set in the information setting terminal 11. Now, the amount of information that may be delivered by BLE is as small as approximately 30 bytes, for example. Thus, the delivery device 12 divides delivery information by size transmittable per BLE packet. Then, the delivery device 12 assigns each divided data with a sequence number to identify the divided data and the number of divisions and sequentially delivers the data.

The reception terminal 13 is a terminal device configured to receive delivered information. For example, the reception terminal 13 may be an information processing device or the like such as a smart phone, a tablet terminal, a personal computer or the like held by a user. The reception terminal 13 receives information delivered from the delivery device 12. The reception terminal 13 couples received information to restore information prior to division. This allows the delivery system 10 to directly provide usable information without being provided with a management server additionally. In the embodiment, the reception terminal corresponds to a second terminal device.

Figure 2:
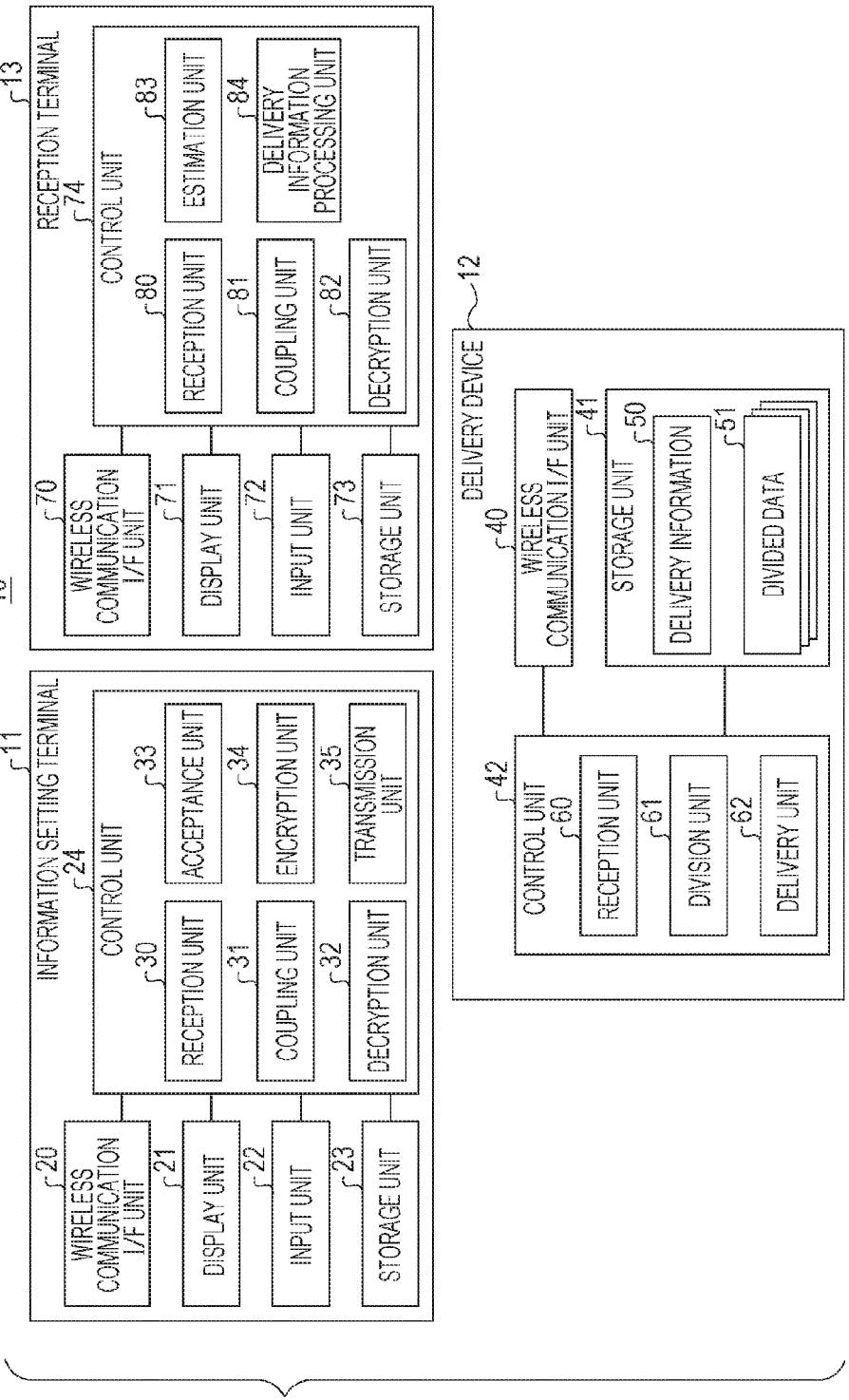
FIG. 2 is a diagram illustrating an example of a functional configuration of an information setting terminal, a delivery device, and a reception terminal.

Configuration of the Information Setting Terminal, the Delivery Device, and the Reception Terminal Next, a configuration of the information setting terminal 11, the delivery device 12, and the reception terminal 13 is described hereinafter. FIG. 2 is a diagram illustrating an example of a functional configuration of an information setting terminal, a delivery device, and a reception terminal. As illustrated in FIG. 2, the information setting terminal 11 has a wireless interface (I/F) unit 20, a display unit 21, an input unit 22, a storage unit 23, and a control unit 24. Note that the information setting terminal 11 may have any other device other than the devices mentioned above. For example, the information setting terminal 11 may have other communication unit that performs communications by using a mobile communication network or wireless local area network (LAN) and that differs from the wireless communication I/F unit 20.

The wireless communication I/F unit 20 is an interface configured to control communications with other devices. The wireless communication I/F unit 20 may further correspond to Bluetooth (registered trademark) Classic.

The wireless communication I/F unit 20 transmits or receives various types of information to or from other device through near field communications. For example, the wireless communication I/F unit 20 receives information delivered by the delivery device 12 via BLE. The wireless communication I/F unit 20 also transmits various types of information to the delivery device 12 through wireless communications of BLE.

Now, wireless communication to be used in the delivery system 10 according to the embodiment is described. The communication scheme of BLE has a connection mode in which one-to-one communication is possible, and an advertise mode in which one-way communication between one and n is possible. The advertise mode broadcasts a packet without establishing a connection and transmits a packet in a predetermined cycle. The connection mode is a communication scheme of the paring scheme that enables continuous transmission and reception of packets when connection is established, and thus has a faster communication speed than the advertise mode. Then, the delivery system 10 according to the embodiment transmits various types of information to the delivery device 12 through communications in the connection mode of BLE. For example, the information setting terminal 11 transmits delivery information to the delivery device 12 through communications in the communication mode of BLE. The delivery device 12 divides the delivery information by predetermined size transmittable per BLE packet and sequentially delivers the information.

Figure 3:
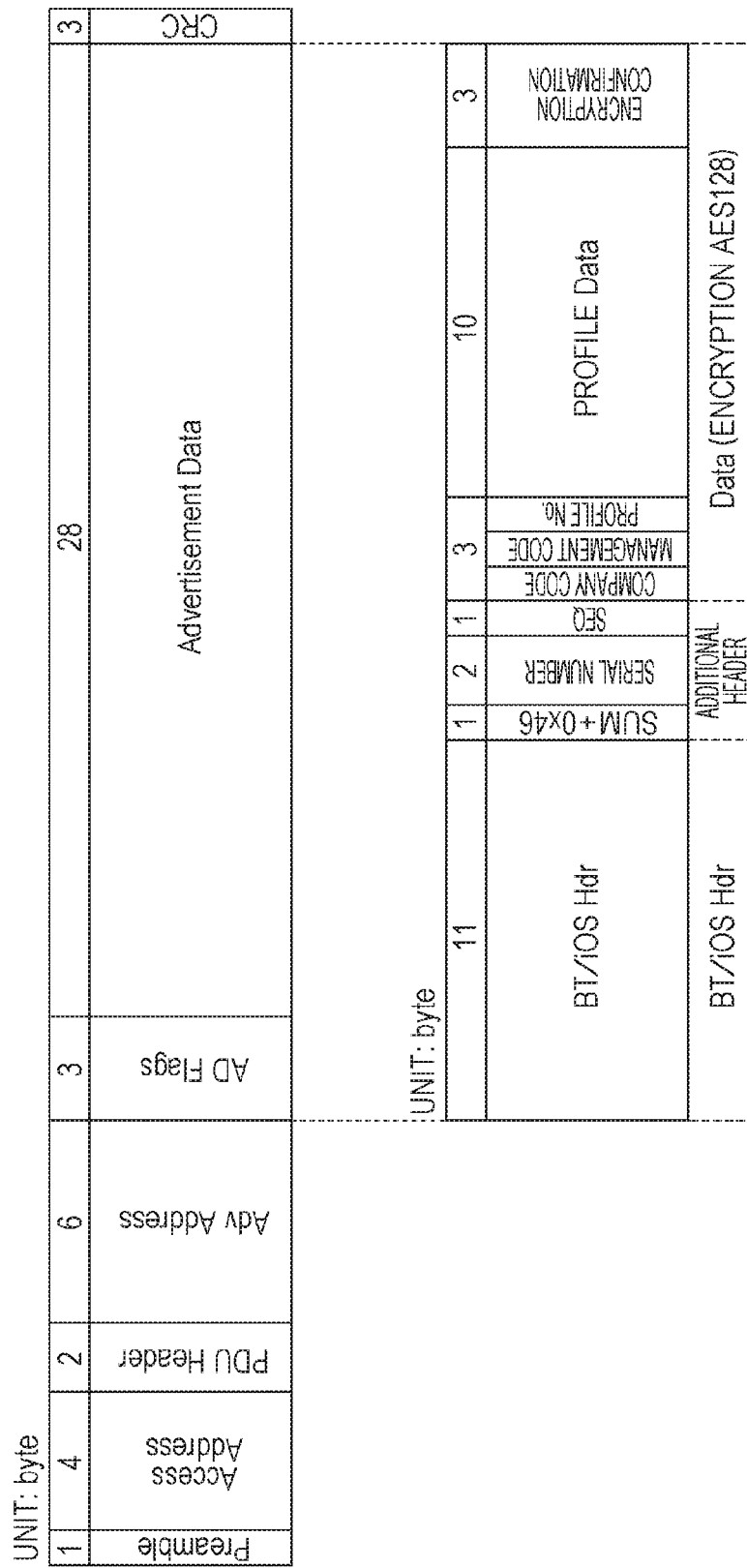
FIG. 3 is a diagram illustrating an example of a format of a packet.

Now, a format of a packet when various types of information are transmitted in the advertise mode is described. FIG. 3 is a diagram illustrating an example of a format of a packet. FIG. 3 illustrates an example of a format of a packet of wireless communications to be used in the communications of BLE. As illustrated in FIG. 3, a packet has respective areas of "Preamble", "Access Address", "PDU Header", "Adv Address", "AD Flags", "Advertisement Data", and "CRC". "Preamble", "Access Address", "PDU Header", "Adv Address", and "CRC" are areas where data in compliance with BLE is stored. In the embodiment, various types of information are transmitted by using 31 bytes of "AD Flags" and "Advertisement Data" areas.

For example, in the embodiment of FIG. 3, the 31 bytes of "AD Flags" and "Advertisement Data" areas are divided to "BT/iOS Hdr", "Additional Header", and "Data", respectively.

The area of "BT/iOS Hdr" has data size of 11 bytes and data complying with iBeacon (registered trademark) is stored therein.

The area of "Additional Header" is divided to areas of "SUN+0x46", "Serial Number", and "SEQ". The "SUN+0x46" area has data size of 1 byte and a control code to control communications is stored therein. The "Serial Number" area has data size of 2 bytes and a serial number to identify the delivery device 12 is stored therein. Each delivery device 12 is assigned with a unique serial number. In the "Serial Number" area is stored a serial number of the delivery device 12 of a delivery source of a packet. The "SEQ" area has data size of 1 byte, and when data is divided and delivered, a sequence number to identify the delivered data and the number of divisions are respectively divided to 4 bits and stored. For example, in the case of the 8th division number of 15 division numbers, bits "10001111" resulting from [8/15] are stored therein.

The "Data" area is divided to areas of "Company Code", "Management Code", "Profile No.", "Profile Data", and "Encryption Confirmation". The areas of "Company Code", "Management Code", and "Profile No." have data size of 3 bytes in total. In the embodiment, since 16 types of formats may be defined, 4 bits are reserved for data size of the Profile Data" area. Data size of "Company Code" and "Management Code" may be arbitrarily defined as far as the size fits within 3 bytes. For example, data size of the "Company Code" area may be 12 bits and data size of the "Management Code" area may be 8 bits. The "Company Code" area is an area where identification information to identify a data delivery source is stored. Unique identification information is assigned to the delivery source. For example, a unique Company Code is assigned as company identification information to a delivery source company that uses the delivery system 10 according to the embodiment. In the "Company Code" area is stored the company code of the delivery source. The "Management Code" area is an area to store identification information to manage delivery at a delivery source. For example, if different information is delivered from different delivery devices 12 and it is desirable to divide reception terminals 13 capable of receiving, the delivery source assigns different management codes. The "Profile No." area is an area to store profile information that indicates a type of delivery information. Now, in the delivery system 10 according to the embodiment, multiple types of data are delivered through wireless communications. In the embodiment, it is possible to define 16 types of formats of Profile No: 00 to 15 as a type of delivery information, and a format is defined for Profile No: 00, 01, 02, 03, 04, and 15. In the "Profile No." area is stored Profile No corresponding to a type of data. The "Profile No." area is an area to store data corresponding to Profile No. Details of data to be stored in the "Profile Data" area are described below. The "Encryption Confirmation" area has data size of 3 bytes, and is an area to store confirmation data that is to confirm whether data in the "Profile Data" area may be correctly decrypted, if the data in the "Profile Data" area is decrypted.

In the delivery system 10 according to the embodiment, the information setting terminal 11 transmits delivery information of Profile No: 01, 02, 03, 04, 15 to the delivery device 12 through wireless communications in the connection mode of BLE. The delivery device 12 divides the received delivery information by size transmittable per packet in the advertise mode of BLE. Then, delivery device 12 assigns to each piece of divided data thus divided a sequence number to identify the piece of divided data and the number of divisions, and sequentially delivers the data.

A format of delivery information is described hereinafter. FIG. 4A is a diagram illustrating an example of a data format of Profile No: 01.

Profile No: 01 is data that stores settings related to a wireless LAN. As illustrated in FIG. 4A, Profile No: 01 has areas of "Control Address", "Distance Condition", and "Signal Intensity". Profile No: 01 also has areas of "SIZE (1)", "Wireless LAN Connection (SSID)", "SIZE (2)", "Wireless LAN Connection (Security Key)", "SIZE (3)", and "STRING (URL)". Data of Profile No: 01 is up to 234 bytes in total.

The "Control Address" area has data size of 1 byte and is an area to store control information on what control is performed under distance conditions. A coding system of the control address may be designed by a developer who develops an application using the delivery system 10. The "Distance Condition" area has data size of 1 byte and is an area to store range information that indicates a target range depending on a distance from the delivery device 12. In the embodiment, four patterns of unlimited, equal or longer, shorter, and proximate may be set as a target range. In the embodiment, a reference distance is 1 m, for example. The "Signal Intensity" area is an area to store standard signal intensity at a predetermined distance. In the embodiment, a predetermined distance is, for example, 1 m which is same as the reference distance. Now, in wireless communications, even when packets are transmitted at same signal intensity from the delivery device 12, the signal intensities of received packets varies. Data of standard signal intensity in the "Signal Intensity" area is used as a reference when a distance from signal intensity is estimated on the receiving side.

Data size of each area of "Wireless LAN Connection (SSID)", "Wireless LAN Connection (Security Key)", and "STRING (URL)" may be changed, respectively. In the embodiment, the "Wireless LAN Connection (SSID)" area is 32 bytes, the "Wireless LAN Connection (Security Key)" area is 64 bytes, and the "STRING (URL)" area is 132 bytes.

The "SIZE (1)" area has data size of 1 byte ad is an area to store data size of the "Wireless LAN Connection (SSID)" area. In the embodiment, in the "SIZE (1)" area is stored a value indicative of 32 bytes, which is the data size of the "Wireless LAN Connection (SSID)" area. The "Wireless LAN Connection (SSID)" area is an area to store a service set identifier (SSID) that is set for a wireless LAN. The "SIZE (2)" area has data size of 1 byte and is an area to store data size of the "Wireless LAN Connection (Security Key)" area. In the embodiment, in the "SIZE (2)" area is stored a value indicative of 64 bytes, which is the data size of the "Wireless LAN Connection (Security Key)" area. The "Wireless LAN Connection (Security Key)" area is an area to store a security key that is set for a wireless LAN. The "SIZE (3)" area has data size of 1 byte and is an area to store data size of the "STRING (URL)" area. In the embodiment, in the "SIZE (2)" area is stored a value indicative of 132 bytes, which is the data size of the "String (URL)" area. The "String (URL)" area is an area to store a uniform resource locator (URL) to access first when communications become possible in the wireless LAN.

FIG. 4A is a diagram illustrating one example of a format of a packet of Profile No: 02.

Profile No: 02 is data that sets a string such as a URL or the like. As illustrated in FIG. 4B, Profile No: 02 has areas of "Control Address", "Distance Condition", and "Signal Intensity". Profile No: 02 also has "Size" and "String (URL)" areas. The data of Profile No: 02 is up to 234 bytes in total.

The areas of "Control Address", "Distance Condition", and "Signal Intensity" is similar to FIG. 4A and thus a description is omitted.

The data size of the "String (URL)" area may be changed. In the embodiment, the "String (URL)" area is 230 bytes.

The data size of the "SIZE" area is 1 byte and is an area to store the data size of the "String (URL)" area. In the embodiment, the "SIZE" area is stored a value indicative of 230 bytes which is data size of the "String (URL)". The "String (URL)" area is an area to store a string that delivers an URL or the like.

FIG. 4C is a diagram illustrating an example of a data format of Profile No: 03.

Profile No: 03 is data to set a message. As illustrated in FIG. 4C, Profile No: 03 has areas of "Control Address", "Distance Condition", and "Signal Intensity". Profile No: 03 also has areas of "Size (1)", "String (Title)", "Size (2)", and "String (Message)". The data in Profile No: 03 is up to 234 bytes in total.

Since the areas of "Control Address", "Distance Condition", and "Signal Intensity" is similar to FIG. 4A, and thus a description is omitted.

The data size of each area of "String (Title)" and "String (Message)" may be changed, respectively. In the embodiment, the "String (Title)" area is 30 bytes and the "String (Message)" area is 199 bytes.

The "Size (1)" area has data size of 1 byte and is an area to store data size of the "String (Title)" area. In the embodiment, in the "Size (1)" area is stored 30 bytes which is the data size of the "String (Title)" area. The "String (Title)" area is an area to store a string that is displayed as a message title. The "Size (2)" area has data size of 1 byte and is an area to store data size of the "String (Message)" area. In the embodiment, in the "Size (2)" area is stored 199 bytes which is the data size of the "String (Message)" area. The "String (Message)" area is an area to store a string that is displayed as a message text.

FIG. 4D is a diagram illustrating an example of a data format of Profile No: 04.

Profile No: 04 is data to set an ID of a layer structure. As illustrated in FIG. 4D, Profile No: 04 has areas of "Control Address", "Distance Condition", and "Signal Intensity". Profile No: 04 also has areas of "First Layer ID", "Second Layer ID", and "Third Layer ID". The data in Profile No: 04 is up to 9 bytes in total.

Since the areas of "Control Address", "Distance Condition", and "Signal Intensity" is similar to FIG. 4A, and thus a description is omitted.

The data size of each area of "First Layer ID", "Second Layer ID", and "Third Layer ID" has data size of 2 bytes and is an area to store an ID of a layer structure. For example, a shop ID to identify a shop is stored in the "First Layer ID" area. A floor ID to identify a floor in a shop is stored in the "Second Layer ID" area. A shelf ID to identify a shelf in a floor is stored in the "Third Layer ID" area.

FIG. 4E is a diagram illustrating an example of a data format of Profile No: 15.

Profile No: 15 is data in a free format. In Profile No: 15, a format may be designed by a developer who develops an application using the delivery system 10. As illustrated in FIG. 4E, Profile No: 15 has an area of "free format". The data in Profile No: 15 is up to 234 bytes in total.

The "free format" area has data size of 234 bytes and is an area to store data of a format designed by a developer.

In the delivery system 10 according to the embodiment, the information setting terminal 11 transmits delivery information of Profile No: 01, 02, 03, 04, 15 to the delivery device 12 through communications in the connection mode of BLE. The delivery device 12 divides the received delivery information to size transmittable per packet of the advertise mode of BLE. Then, the delivery device 12 assigns each piece of divided data thus divided a sequence number to identify the piece of divided data and the number of divisions and sequentially delivers the data in the advertise mode of BLE.

A format of a packet when the delivery device 12 transmits information of each Profile No. in the advertise mode of BLE is descried hereinafter. If no delivery information is set, a packet of Profile No: 00 is delivered. On the other hand, when the delivery information is set, the delivery device 12 divides delivery target data to size transmittable per packet of BLE and delivers the data. In the embodiment, the size is up to 240 bytes by totaling 3 bytes of the "Company Code", "Management Code", and "Profile No." areas, maximum 234 byes of Profile No: 01 to 15, and 3 bytes of the "Encryption Confirmation" area. The delivery device 12 divides the data of at most 240 bytes into at most 15 pieces, each being 16 bytes, and delivers the data.

Figure 5:
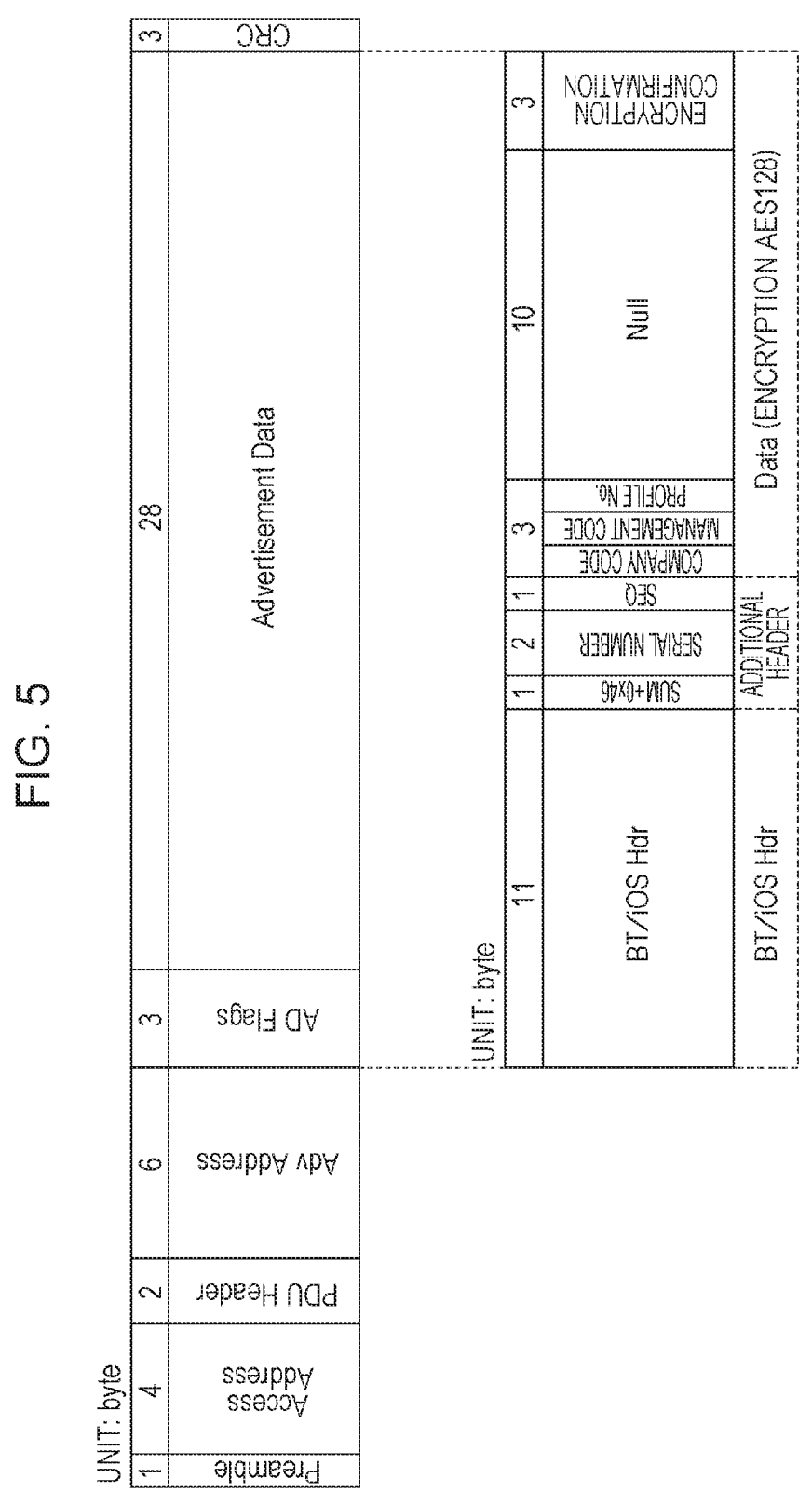

FIG. 5 is a diagram illustrating an example of a packet format. FIG. 5 illustrates an example of a format of a packet transmitted by BLE. FIG. 5 illustrates a packet of Profile No: 00. A description of any part similar to FIG. 3 is omitted, appropriately.

The "SEQ" area has data size of 1 byte, and when data is divided and delivered, a sequence number to identify the delivered data and the number of divisions are stored separately, each being 4 bits. Since the data in Profile No: 00 illustrated in FIG. 5 is transmitted in one packet without being divided, "1/1" is fixedly stored in the "SEQ" area.

A company code of the delivery device 12 of the delivery source of the packet is stored in the "Company Code" area. In the "Management Code" area, a predetermined initial value is stored if the delivery device 12 is in an initial state and a changed management code is stored if the management code is changed. The "Profile No." area is an area to store profile information indicative of a type of data to be delivered. FIG. 5 is a format of a packet of Profile No: 00. Thus, "00" is fixedly stored in the "Profile No." area. In the example of FIG. 5, the "Profile Data" area illustrated in FIG. 3 is made "NULL" area. The "NULL" area has data size of 10 bytes and is an area provided to adjust packet size to data size that complies with iBeacon (registered trademark). Null data is stored in the "NULL" area.

Figure 6A:
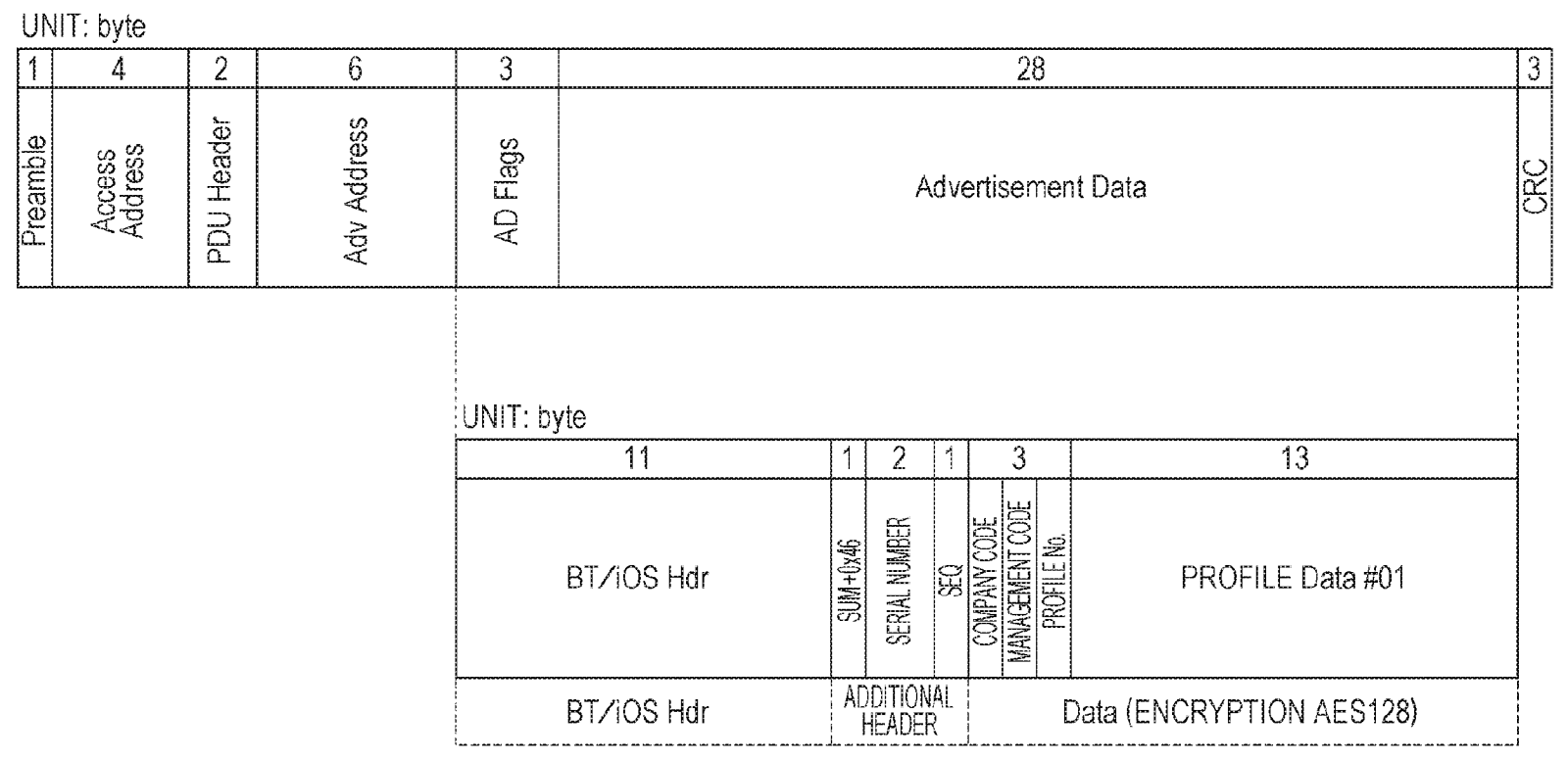
Figure 6C:
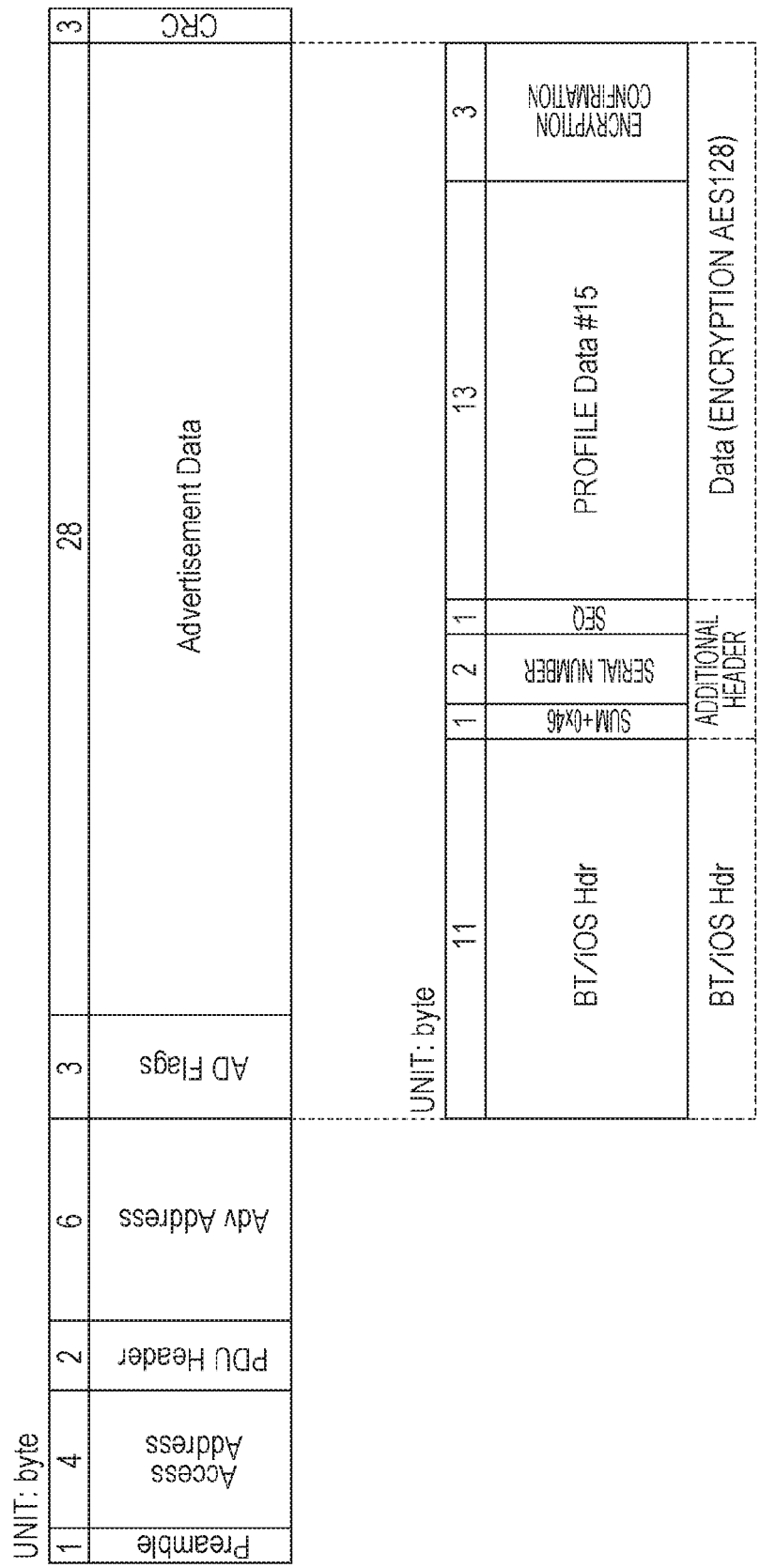
FIG. 6C is a diagram illustrating an example of a packet format.

FIGS. 6A to 6C are diagrams illustrating examples of packet formats. FIG. 6A to 6C illustrates an example of a format of a packet in which delivery information is divided into 15 pieces and which is transmitted in the advertise mode of BLE. FIG. 6A illustrates a packet of a sequence number "1". FIG. 6B illustrates packets of sequence numbers "2" to "14". FIG. 6C illustrates a packet of a sequence number "15". Note that a description of parts similar to FIG. 3 is omitted, appropriately.

For the "SEQ" area, when the data is divided and delivered, the sequence number to identify delivered data and the number of divisions are separately stored, each being 4 bits.

In the "Data" area illustrated in FIG. 6A is stored the divided information of first 16 bytes that is the divided delivery data, and is separated to areas of "Company Code", "Management Code", "Profile No.", and "Profile Data". The "Data" area illustrated in FIG. 6B stores the divided data of 16 bytes of an intermediate part, and is made the area of "Profile Data". In the "Data" area illustrated in FIG. 6C is stored the divided data of last 16 bytes that is the divided delivery information, and is separated to areas of "Profile Data" and "Encryption Confirmation".

Turning back to FIG. 2, the display unit 21 is a display device configured to display various types of information. The display unit 21 includes a display device such as a liquid crystal display (LCD). The display unit 21 displays various types of information. For example, the display unit 21 displays various types of screens such as various operating screens.

The input unit 22 is an input device configured to input various types of information. For example, the input device includes various buttons provided on the information setting terminal 11 or an input device, such as a transparent touch sensor, provided on the display unit 21. For example, the input unit 22 accepts various operation inputs related to verification. The input unit 22 accepts an operation input from a user and inputs operation information indicating content of the accepted operation. The example of FIG. 2 illustrates a functional configuration in which the display unit 21 and the input unit 22 are separated. Instead, a device, such as a touch panel, in which the display unit 21 and the input unit 22 are integrally provided, may be provided.

The storage unit 23 is a storage device configured to store various types of data. For example, the storage unit 23 is a semiconductor memory capable of rewriting data, such as a random access memory (RAM), a flash memory, or a non-volatile static random access memory (NVSRAM). Note that the storage unit 23 may also be a storage device such as a hard disk, a solid state drive (SSD), or an optical disk.

The storage unit 23 stores an operating system (OS) to be run by the control unit 24 or various programs. For example, the storage unit 23 stores various programs including a program to perform processing to be described below. Furthermore, the storage unit 23 stores information related to various types of data or various settings to be used in a program to be executed by the control unit 24.

The control unit 24 is a device configured to control the information setting terminal 11. As the control unit 24, an electronic circuit such as a central processing unit (CPU), a micro processing unit (MPU), or the like, or an integrated circuit such as an application specific integrated circuit (ASIC), a field programmable gate array (FPGA), or the like, may be adopted. The control unit 24 has an internal memory to store a program that defines various processing procedures or control data, and performs various processes by using the program or the control data. The control unit 24 functions as various process units by various programs operating. For example, the control unit 24 has a reception unit 30, a coupling unit 31, a decryption unit 32, an acceptance unit 33, an encryption unit 34, and a transmission unit 35.

The reception unit 30 receives information delivered from the delivery device 12 by way of the wireless communication I/F unit 20. For example, if the delivery device 12 is in an initial state, the reception unit 30 receives a packet in the format illustrated in FIG. 5 from the delivery device 12. In addition, for example, if delivery information is set in the delivery device 12, the reception unit 30 receives from the delivery device 12 a packet including divided data obtained by dividing the delivery information. For example, the reception unit 30 receives a packet of the format illustrated in FIGS. 6A to 6C from the delivery device 12.

The coupling unit 31 couples data of received BLE packets. For example, the coupling unit 31 determines a sequence number and number of divisions from data in the "SEQ" area of the received packet. Then, the coupling unit 31 judges whether packets for which serial numbers included in the packets match and which have sequence numbers corresponding to the number of divisions are all received. When all packets which have sequence numbers corresponding to the number of divisions are received, the coupling unit 31 couples data in the "Data" area of the packet in the order of sequence numbers.

The decryption unit 32 decrypts data coupled by the coupling unit 31. Details of decryption are described below. With this, the company code, the management code, the profile No, and data defined by the profile No. of the decrypted data are restored to a state before encryption.

The acceptance unit 33 accepts various inputs. For example, the acceptance unit 33 displays various screens on the display unit 21 and accepts input from the input unit 22. For example, the acceptance unit 33 displays input of the company code/management code input screen and accepts input of the company code and the management code.

FIG. 7 is a diagram illustrating an example of a screen for inputting a company code/management code. A company code and management code input screen 100 has a company code input area 101, a management code input area 102, and an OK button 103.

A manager inputs a company code in the input area 101, inputs a management code in the input area 102, and selects the OK button 103.

The acceptance unit 33 stores in the storage unit 23 the company code and the management code inputted from the company code and management code input screen 100, as a specified company code and a specified management code.

When a company code and a management code decrypted by the decryption unit 32 match the specified company code and the specified management code, the acceptance unit 33 displays information related to the delivery device 12, which is a delivery source of the restored data, on the display unit 21. For example, the acceptance unit 33 displays a terminal number of the delivery device 12 of the delivery source on the display unit 21. Note that it may be possible that there are multiple delivery devices 12 whose company code and management code match, and that in such a case, terminal numbers of the multiple delivery devices are displayed.

The acceptance unit 33 accepts from the displayed delivery device selection of a change target delivery device 12 whose various settings are changed. The acceptance unit 33 acquires the settings from the selected change target delivery device 12. For example, the acceptance unit 33 connects to the change target delivery device 12 in the connection mode to acquire the set various types of information. For example, the acceptance unit 33 acquires from the change target delivery device 12 delivery information, a control address, a distance condition, signal intensity, a packet transmission cycle, a packet switching cycle, or the like.

The acceptance unit 33 displays on the display unit 21 various setting change screens, where the settings of the change target delivery device 12 are changed, and accepts input from the input unit 22. For example, the acceptance unit 33 displays a menu screen of the setting change and accepts input of delivery information, a control address, a distance condition, signal intensity, a packet transmission cycle, or a packet switching cycle, or the like that are displayed from respective displayed screens from the menu screen.

Figure 8A:
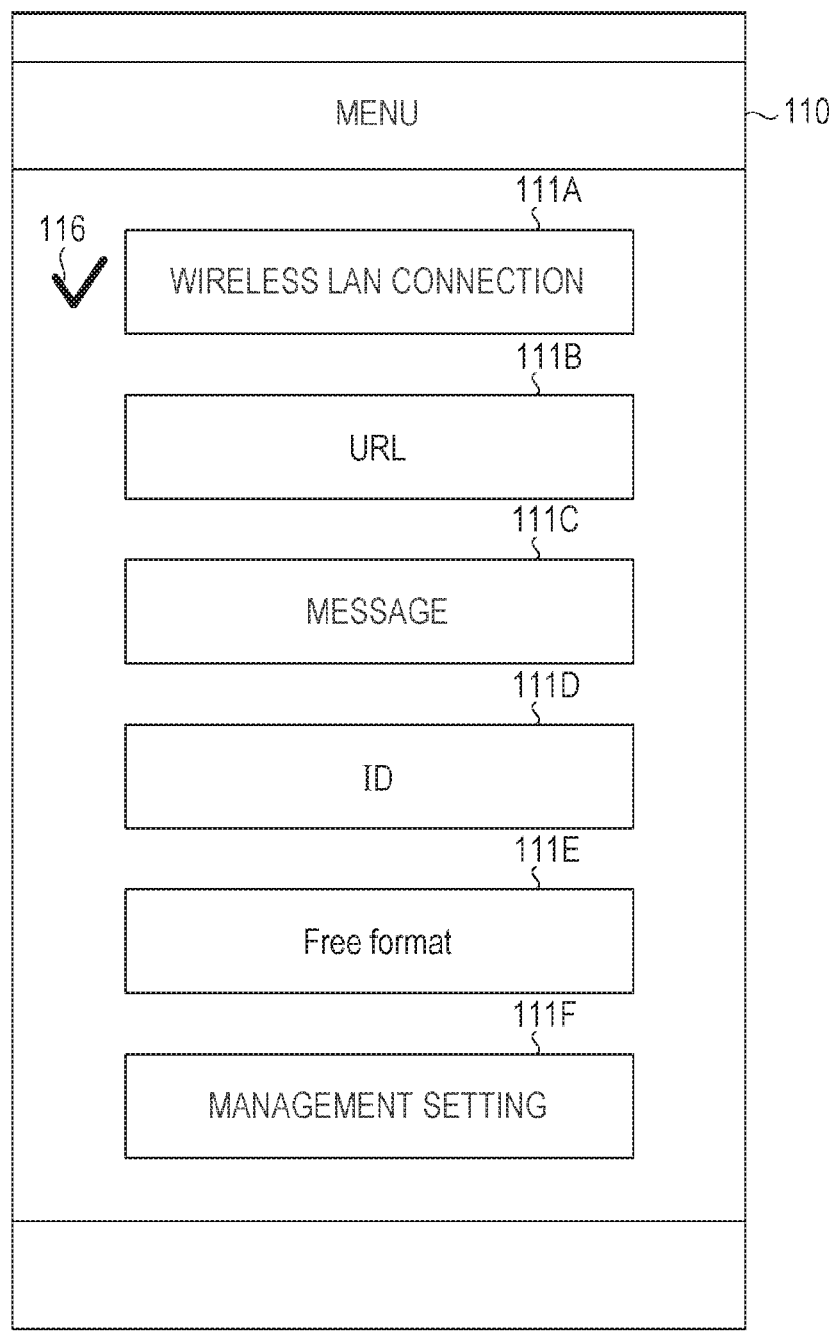
FIG. 8A is a diagram illustrating an example of a menu screen of setting change.

FIG. 8A is a diagram illustrating an example of a menu screen of setting change. A menu screen 110 has a wireless LAN connection button 111A, a URL button 111B, a message button 111C, an ID button 111D, a Free format button 111E, and a management setting button 111F. When the wireless LAN connection button 111A is selected, the setting change screen related to the wireless LAN is displayed. When the URL button 111B is selected, the setting change screen related to URL is displayed. When the message button 111C is selected, the setting change screen related to a message is displayed. When the ID button 111D is selected, the setting change screen related to ID is displayed. When the Free format button 111E is selected, the setting change screen to set data in a free format is displayed. When the management setting button 111F is selected, the setting change screen for performing management setting such as a delivery operation is displayed. The delivery device 12 may set delivery information with any one of Profile No: 01 to 15. Thus, any one of the wireless LAN, the URL, the message, the ID, the free format is selected on the menu screen 110, and the delivery information is set.

When delivery information is set for the change target delivery device 12, the acceptance unit 33 displays a check mark 116 corresponding to the button 111 depending on a type of the delivery information. The example of FIG. 8A illustrates that delivery information related to the wireless LAN connection is set for the change target delivery device 12. When the information is set for the delivery device 12, the set information is displayed on the setting change screen by default. In the example of FIG. 8A, when the LAN connection button 111A is selected, the set information is displayed on the setting change screen related to the wireless LAN by default.

Figure 8B:
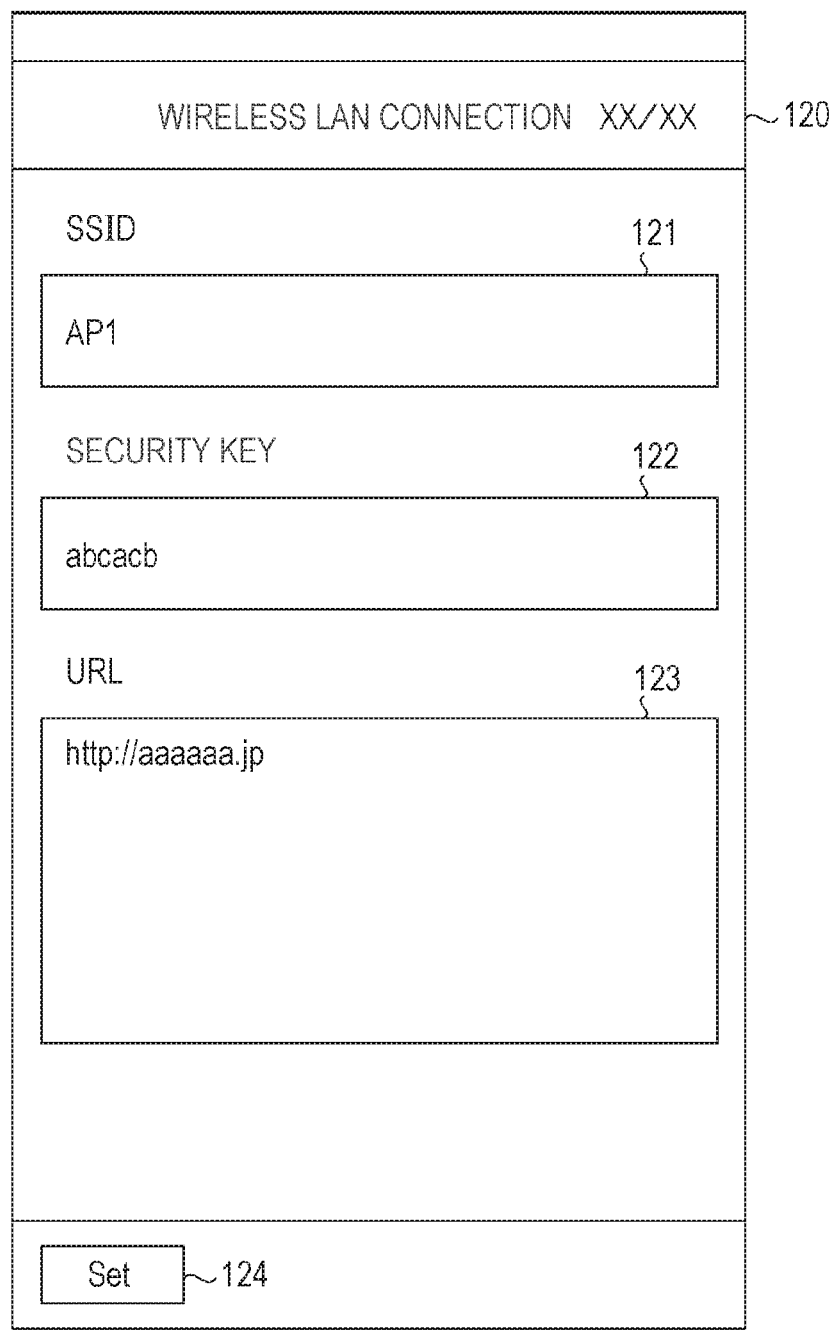
FIG. 8B is a diagram illustrating an example of a setting change screen related to a wireless LAN.

FIG. 8B is a diagram illustrating an example of a setting change screen related to a wireless LAN. A setting change screen 120 has an SSID input area 121, a security key input area 122, a URL input area 123, and a Set button 124.

The manager inputs an SSID to be set for the wireless LAN in the input area 121, and a security code to be set for the wireless LAN in the input area 122. Then, the manager inputs URL to access first in the input area 123, and selects the Set button 124. When the Set button 124 is selected, the acceptance unit 33 generates data of a profile corresponding to a type of delivery information. For example, the acceptance unit 33 generates data of Profile No: 01 illustrated in FIG. 4A, based on the information inputted on the setting change screen 120.

Figure 8C:
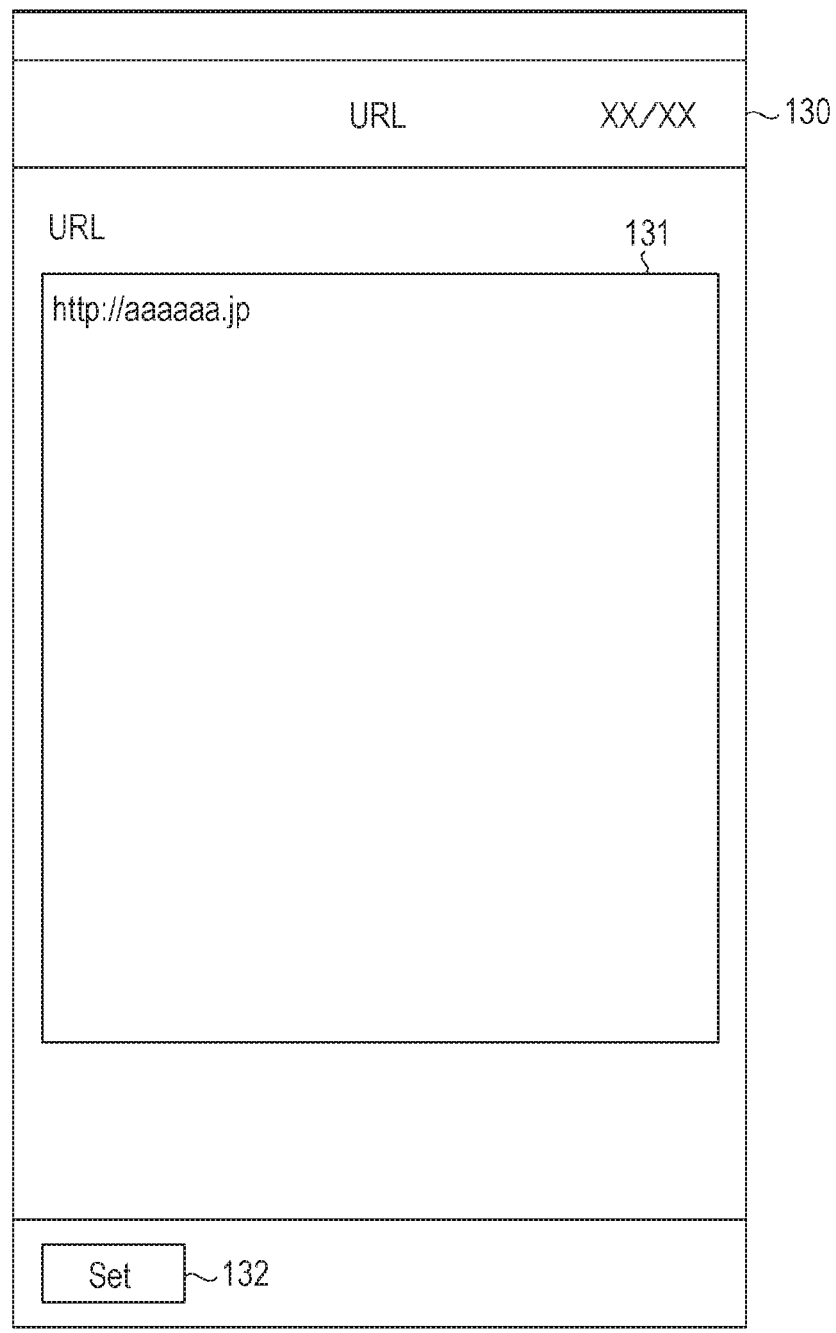
FIG. 8C is a diagram illustrating an example of a setting change screen related to URL.

FIG. 8C is a diagram illustrating an example of a setting change screen related to URL. A setting change screen 130 has a URL input area 131 and a Set button 132.

The manager inputs URL, to which a reference is made, in the input area 131 and selects the Set button 132. When the Set button 132 is selected, the acceptance unit 33 generates data of Profile No: 02 illustrated in FIG. 4B based on the information inputted on the setting change screen 130.

Figure 8D:
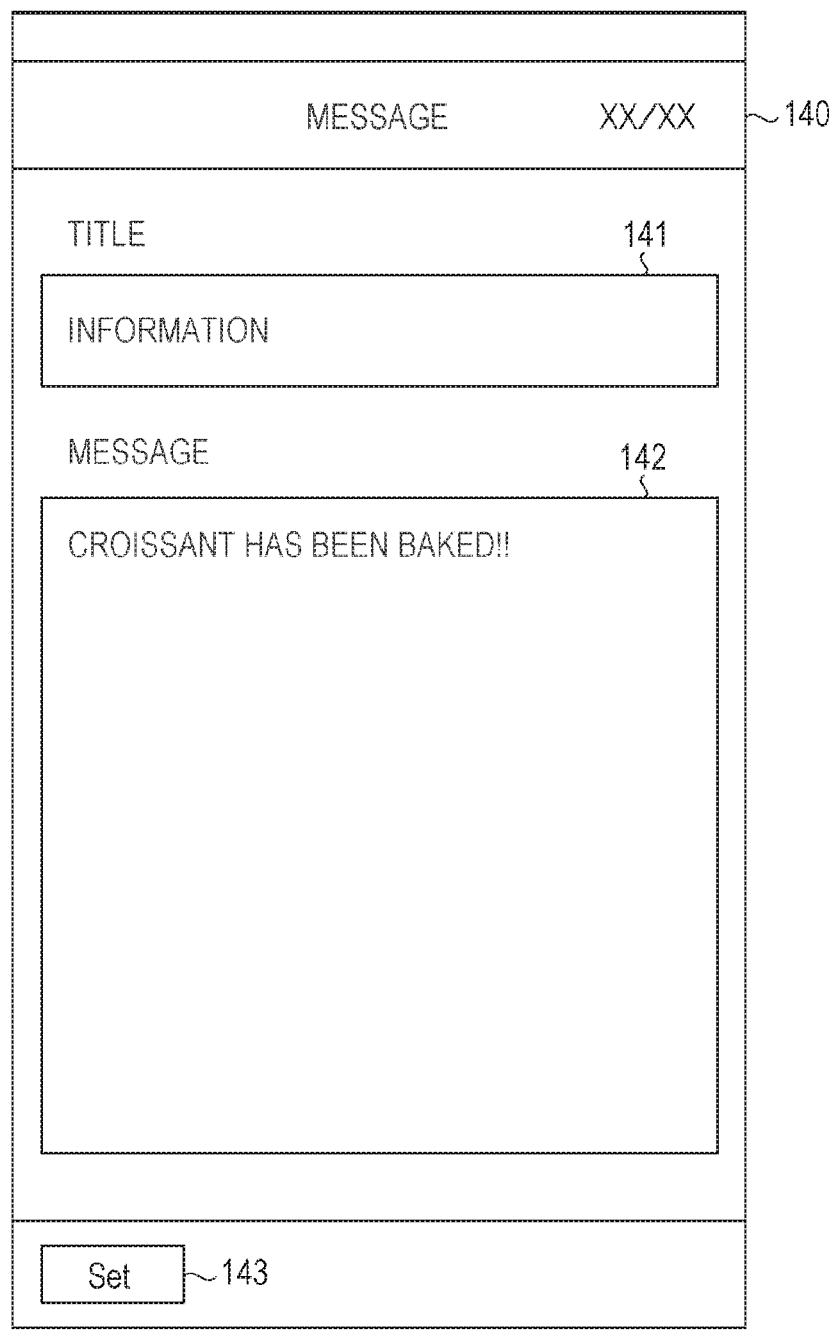
FIG. 8D is a diagram illustrating an example of a setting change screen related to a message.

FIG. 8D is a diagram illustrating an example of a setting change screen related to a message. A setting change screen 140 has a message title input area 141, a message text input area 142, and a Set button 143.

The manager inputs a title of a message to be delivered in the input area 141 and a text of the message to be delivered in the input area 142, and selects the Set button 143. When the Set button 143 is selected, the acceptance unit 33 generates data of Profile No: 03 illustrated in FIG. 4C based on the information inputted on the setting change screen 140.

FIG. 8E is a diagram illustrating an example of a setting change screen related to an ID. A setting change screen 150 has a first layer ID input area 151, a second layer ID input area 152, a third layer ID input area 153, and a Set button 154.

The manager inputs an ID of a first layer to be delivered in the input area 151, an ID of a second layer to be delivered in the input area 152, and an ID of a third layer to be delivered in the input area 13, and select the Set button 154. When the Set button 154 is selected, the acceptance unit 33 generates data of Profile No: 04 illustrated in FIG. 4D based on the information inputted on the setting change screen 150.

FIG. 8F is a diagram illustrating an example of setting change screen of data in a free format. A setting change screen 160 has a data input area 161 and a Set button 162.

The manager inputs data to be delivered in the input area 161 and selects the Set button 162. When the Set button 162 is selected, the acceptance unit 33 generates data of Profile No: 15 illustrated in FIG. 4E based on the information inputted on the setting change screen 160.

FIG. 8G is a diagram illustrating an example of a setting change screen for performing management setting. A setting change screen 170 has a management code input area 171, a packet transmission cycle input area 172, a packet switching cycle input area 173, a control address input area 174, a distance condition input area 175, a signal intensity input area 176, and a Set button 177. When the distance condition input area 175 is selected, selection candidates of the distance conditions are displayed. For example, as the selection candidates of the distance conditions, unlimited, longer than a reference distance, shorter than the reference distance, and proximate are displayed in the input area 175. Selecting from the displayed selection candidates allows the input area 175 to be entered.

The Manager inputs on the setting change screen 170 change content on a target whose settings are changed. For example, when the manager changes the management code, the manager inputs a new management code in the input area 171. When changing the packet transmission cycle and the packet switching cycle in BLE, the manager also inputs a new packet transmission cycle in the input area 172 and a new packet switching cycle in the input area 173. When changing the control address, the manager also inputs a new control address in the input area 174. When changing the distance condition, the manager also selects a new distance condition in the input area 175. When changing the signal intensity of the reference to be delivered, the manager also inputs signal intensity of a new reference in the input area 176. When the setting change is complete, the manager selects the Set button 177. When the Set button 177 is selected, the acceptance unit 33 sets to the delivery device 12 the transmission cycle in the input area 172 and the switching cycle in the input area 173 on the setting change screen 170. In addition, the acceptance unit 33 generates data of a profile for which the management code in the input area 171, the control address in the input area 174, the distance condition in the input area 175, and the signal intensity in the input area 176 on the setting change screen 170 are set. For example, the acceptance unit 33 generates data of a profile for which the management code, the control address, the distance condition, and the signal intensity are changed, for data of a profile displayed by default.

The encryption unit 34 encrypts data of the profile generated at the reception unit 33. For example, the encryption unit 34 uses an encryption key to encrypt data accepted from the acceptance unit 33 at the advanced encryption standard (AES) 128 Bit. If the encryption unit 34 directly encrypts accepted data, in some cases, data to be encrypted may not match the unit of block encryption. The encryption unit 34 encrypts the accepted data by, for example, adding a predetermined code such as Null, so that the data to be encrypted may be divided by predetermined size for the block encryption. For example, in the embodiment, the predetermined size is 16 bytes, and a total of the company code, the management code, and profile No is 3 bytes, and confirmation data is 3 bytes. Thus, the encryption unit 34 adds the predetermined code to the data in the accepted profile so that a total of 6, the number of bytes of the data in the accepted profile and the number of bytes of the predetermined code can be a multiple of 16, and encrypts the resultant data. That is to say, the encryption unit 34 adds the predetermined code to the profile data so that the total size of the profile data and additional data to be encrypted with the profile data can be divided by predetermined size, and then encrypts the resultant data.

As an encryption key used in encryption and decryption, the information setting terminal 11 and the reception terminal 13 may store same data in advance or may generate the data according to predetermined rules. If the data is generated according to the predetermined rules, the information setting terminal 11 and the reception terminal 13 stores the same base key in advance. The information setting terminal 11 and the reception terminal 13 convert the base key using the serial number included in the header of a received packet according to the predetermined rules to generate the encryption key. With this, a same encryption key is generated for packets received from the same delivery device 12. Although the case where a serial number is acquired from a received packet is described, the serial numbers of the delivery devices 12 which are targets of information update may be stored in advance in the information setting terminal 11 if the delivery devices 12 which are targets of information update are limited. Furthermore, an encryption key that has been converted from the base key using the serial number according to the predetermined rules may be stored in advance.

FIG. 9A is a diagram illustrating flow of encryption. The acceptance unit 33 generates profile data. In FIG. 9A(A), the profile data of 240 bytes to which confirmation data is added is generated. The confirmation data is data to confirm whether encrypted data is correctly decrypted. The confirmation data is generated from, for example, profile data, according to the predetermined rules.

For example, the encryption unit 34 uses a serial number to generate an encryption key and uses the generated encryption key to encrypt the profile data. In FIG. 9A(B), the profile data is encrypted and 240 bytes of encrypted data is generated.

The transmission unit 35 generates a packet having the encrypted data stored in the "Data" area as delivery information and transmits the packet to the change target delivery device 12 through communications in the connection mode of BLE.

A configuration of the delivery device 12 is described hereinafter. As illustrated in FIG. 2, the delivery device 12 has a wireless communication I/F unit 40, a storage unit 41, a the control unit 42. Note that the delivery device 12 may have any device other than the above. For example, the delivery device 12 may have a communication unit configured to perform communications through a mobile communication network or a wireless local area network (LAN).

The wireless communication I/F unit 40 is an interface configured to control communications with other devices. A wireless chip supporting BLE may be used as the wireless communication I/F unit 40. Note that the wireless communication I/F unit 40 may also support Bluetooth (registered trademark) Classic.

The wireless communication I/F unit 40 transmits and receives various types of information to and from other devices, through near field communications. For example, the wireless communication I/F unit 40 delivers information to the information setting terminal 11 and the reception terminal 13, through BLE. In addition, for example, the wireless communication I/F unit 40 receives various types of information from the information setting terminal 11 through communications in the connection mode of BLE.

The storage unit 41 is a storage device configured to store various types of data. For example, the storage unit 41 is a semiconductor memory capable of rewriting data, such as a RAM, a flash memory, and an NVSRAM. Note that the storage unit 41 may be a storage device such as a hard disk, an SSD, or an optical disk.

The storage unit 41 stores an OS or various programs executed by the control unit 42. For example, the storage unit 41 stores various programs, including a program that performs processing to be described below. Furthermore, the storage unit 41 stores various types of data used in a program executed by the control unit 42 or information related to various settings. For example, the storage unit 41 stores delivery information 50 and divided data 51.

The control unit 42 is a device configured to control the delivery device 12. An electronic circuit such as CPU or MPU or an integrated circuit such as an ASIC or FPGA may be adopted as the control unit 42. The control unit 42 has an internal memory to store a program that defines various processing procedures or control data, and performs various processes by using the programs. The control unit 42 functions as various processing units by various programs operating. For example, the control unit 42 has a reception unit 60, a division unit 61, and a delivery unit 62.

The reception unit 60 receives information delivered from the information setting terminal 11 by way of the wireless communication I/F unit 40. For example, the reception unit 60 receives a packet including delivery information from the information setting terminal 11, through communications in the connection mode. The reception unit 60 stores the delivery information included in the received packet as delivery information 50 in the storage unit 41.

The division unit 61 divides the delivery information 50 stored in the storage unit 41 by predetermined size transmittable per packet of BLE. For example, the division unit 61 divides the delivery information 50 into at most 15 pieces of data, each being 16 bytes, in sequence from the front side, and delivers the data. The division unit 61 associates each piece of divided data 51 that is obtained by dividing the delivery information 50 with a sequence number identifying the piece of divided data 51, and stores the data in the storage unit 41. The division unit 61 also stores the number of divisions of the divided data 51 in the storage unit 41.

The delivery unit 62 delivers information through BLE. For example, the delivery unit 62 stores any one of the pieces of the divided data 51 in the "Data" area, and generates a BLE packet that stores a sequence number identifying the divided data 51 and the number of divisions in the "SEQ" area. Then, the delivery unit 62 transmits the generated packet in every packet transmission cycle. The delivery unit 62 also switches the divided data in the order of the sequence number for every packet switching cycle. For example, the delivery unit 62 generates a packet that stores the divided data 51 in the order of the sequence number for every packet switching cycle. Then, the delivery unit 62 transmits the generated packet for every packet transmission cycle. A predetermined initial value of each of the packet transmission cycle and the packet switching cycle is stored in the storage unit 41 and changed by setting from the information setting terminal 11.

The delivery device 12 may be in a sleep state that consumes little battery in conjunction with the packet transmission cycle, in order to reduce battery consumption. For example, the delivery device 12 may have a built-in timer, starts every packet transmission cycle, and enter the sleep state again after transmission of a packet by the delivery unit 62 is complete. The delivery unit 62 may store the number of transmissions of a same packet in the storage unit 41, and generate a BLE packet that switches the divided data 51 and transmit the packet, as being at a switching cycle, when the same packet is transmitted for a predetermined number of times.

FIG. 9B is a diagram illustrating division of delivery information and flow of delivery. The division unit 61 divides encrypted delivery information to predetermined size. In FIG. 9B(A), encrypted delivery information of 240 bytes is divided into 15 pieces of divided data, each being 16 bytes, in sequence from the front side.

The delivery unit 62 generates a packet including divided data and a sequence number of the divided data. The delivery unit 62 generates a packet that stores the divided data 51 in the order of the sequence number, and transmits the generated data in every packet transmission cycle. In FIG. 9B(B), respective packets of the sequence numbers of 1 to 15 are generated and sequentially transmitted.

A configuration of the reception terminal 13 is described hereinafter. As illustrated in FIG. 2, the reception terminal 13 has a wireless communication I/F unit 70, a display unit 71, an input unit 72, a storage unit 73, and a control unit 74. Note that the reception terminal 13 may have any device other than the devices mentioned above. For example, the reception terminal 13 may have a communication unit that performs communications through a mobile communication network or a wireless local area network (LAN).

The wireless communication I/F unit 70 is an interface configured to control communications with other devices. A wireless chip supporting BLE may be used as the wireless communication I/F unit 70. Note that the wireless communication I/F unit 70 may also support Bluetooth (registered trademark) Classic.

The wireless communication I/F unit 70 transmits and receives various types of information with other devices through near field communications. For example, the wireless communication I/F unit 70 receives information delivered from the delivery device 12 in the advertise mode of BLE.

The display unit 71 is a display device configured to display various types of information. The display unit 71 includes a display device such as an LCD. The display unit 71 displays various types of information. For example, the display unit 71 displays various screens such as various operating screens.

The input unit 72 is an input device configured to input various types of information. For example, the input unit 72 includes various buttons provided on the reception terminal 13 or a transparent touch sensor provided on the display unit 71. The input unit 72 accepts input of various types of information. For example, the input unit 72 accepts input of various operations related to verification. The input unit 72 accepts operation input from a user, and inputs in the control unit 74 operation information indicating content of the accepted operation. In addition, while in the example of FIG. 2, a functional configuration is illustrated and thus the configuration is divided to the display unit 71 and the input unit 72, the device may be such configured that the display unit such as a touch panel and the input unit 72 are integrally provided.

The storage unit 73 is a storage device configured to store various types of data. For example, the storage unit 73 is a semiconductor memory capable of rewriting data, such as a RAM, a flash memory, and an NVSRAM. Note that the storage unit 73 may be a storage device such as a hard disk, an SSD, and an optical disk.

The storage unit 73 stores an OS or various programs executed by the control unit 74. For example, the storage unit 73 stores various programs including a program that performs processing to be described below. Furthermore, the storage unit 73 stores various types of data used in a program executed by the control unit 74 or information related to various settings.

The control unit 74 is a device configured to control the reception terminal 13. An electronic circuit such as a CPU or MPU or an integrated circuit such as an ASIC or FPGA may be adopted as the control unit 74. The control unit 74 has an internal memory to store a program that defines various processing procedures or control data, and performs various processes by using the programs. The control unit 74 functions as various processing units by various programs operating. For example, the control unit 74 has a reception unit 80, a coupling unit 81, a decryption unit 82, an estimation unit 83, and a delivery information processing unit 84.

The reception unit 80 receives information delivered from the delivery device 12 by way of the wireless communication I/F unit 70. For example, the reception unit 80 receives a packet including divided data obtained by dividing the delivery information from the delivery device 12. For example, the reception unit 80 receives a packet of the format illustrated in FIGS. 6A to 6C from the delivery device 12.

The coupling unit 81 couples data of the received packet. For example, the coupling unit 81 determines a sequence number and the number of divisions from data in the "SEQ" area of the received packet. Then, the coupling unit 81 judges whether packets for which serial numbers included in the packets match and which have sequence numbers corresponding to the number of divisions are all received. When all packets which have sequence numbers corresponding to the number of divisions are received, the coupling unit 81 couples data in the "Data" area of the packet in the order of sequence numbers.

The decryption unit 82 decrypts the data coupled by the coupling unit 81. The decryption unit 82 uses an encryption key as a decryption key to decrypt data. As described above, for an encryption key, same data may be stored in advance in the information setting terminal 11 and the reception terminal 13 or may be generated according to the predetermined rules. For example, the encryption unit 34 separates a serial number from the received packet. Then, the encryption unit 34 uses the separated serial number to generate an encryption key. For example, the encryption unit 34 generates an encryption key that is converted from a base key according to the predetermined rules by using a serial number. The encryption unit 34 uses the generated encryption key as a decryption key to decrypt profile data. With this, a company code, a management code, a profile No., and data of profile No. of decrypted data are restored to a state before encryption. The decryption unit 82 generates confirmation data from data of profile No according to the predetermined rules, and judge that the data is restored normally when the generated confirmation data matches confirmation data included in restored data.

FIG. 9C is a diagram illustrating flow of coupling and decryption of received data. The reception unit 80 receives a packet including divided data from the delivery device 12. In FIG. 9C(A), respective packets of the sequence numbers of 1 to 15 are received. The coupling unit 81 judges whether all the packets are received from the sequence numbers and the number of divisions of the received packets for every serial number included in the packet. When all the packets of the sequence number corresponding to the number of divisions are received, the coupling unit 81 couples data in the "Data" area of the packet in the order of sequence numbers. In FIG. 9C(B), the data of 16 bytes in the "Data" area of each packet is coupled in the order of sequence numbers to be data of 240 bytes. This data of 240 bytes is encrypted delivery information. The decryption unit 82 decrypts the data using as a decryption key the encryption key that is converted from a base key according to the predetermined rules by using the serial number. In FIG. 9C(C), the encrypted data of 240 bytes is decrypted to be data of 240 bytes that is not encrypted. This data of 240 bytes is delivery information.

Turning back to FIG. 2, the estimation unit 83 estimates a distance from the delivery device 12 that transmitted the packet. The closer the distance from the delivery device 12 is, the higher the signal intensity is. The farther the distance from the delivery device 12 is, the lower the signal intensity is. Then, the estimation unit 83 estimates a distance from the signal intensity when the packet is received at the wireless communication I/F unit 70. Here, in the wireless communications, even when a packet is received at same radio wave transmission power from the delivery device 12, signal intensity of the received packet varies depending on the surrounding environment. Then, the estimation unit 83 uses data of standard signal intensity stored in the "Signal Intensity" area of the packet to estimate a distance. For example, when the signal intensity when the packet is received is larger than the standard signal intensity, the estimation unit 83 estimates that a distance is less than 1 meter from the delivery device 12. In addition, when the signal intensity when the packet is received is equal to or smaller than the standard signal intensity, the estimation unit 83 estimates that the distance from the delivery device 12 is equal to or larger than 1 meter. In addition, in the wireless communications, the signal intensity dramatically drops as the distance is farther, till a proximate predetermined distance is reached. The estimation unit 83 stores a predetermined threshold that is determined from characteristics of the dramatically dropping signal intensity. Thus, when the signal intensity when the packet is received is equal to or larger than the predetermined threshold, the estimation unit 83 determines that the delivery device 12 is proximate. This predetermined threshold is preset according to a distance considered proximate to the delivery device 12. Note that the estimation unit 83 may use the standard signal intensity as a reference to estimate a distance from signal intensity of a received packet. For example, the estimation unit 83 may also estimate a distance by using an arithmetic equation that calculates a distance by using the standard signal intensity and signal intensity of a received packet.

A delivery information processing unit 84 utilizes decrypted delivery information to perform various processes. For example, when a distance estimated by the estimation unit 83 meets a condition in the "Distance Condition" area of the received packet, the delivery information processing unit 84 utilizes decrypted delivery information to perform various processes. The various processes may be a process that the delivery information processing unit 84 performs by utilizing delivery information or a process to provide delivery information to others. For example, when delivery information is data of Profile No: 01, the delivery information processing unit 84 performs setting of a wireless LAN based on the delivery information. In addition, for example, when the delivery information is data of Profile No: 02, the delivery information processing unit 84 accesses a URL of the delivery information to display a page of the URL. In addition, when the delivery information is data of Profile No: 03, the delivery information processing unit 84 displays a message of the delivery information. In addition, for example, when the delivery information is data of Profile No: 04, the delivery information processing unit 84 provides a first layer ID, a second layer ID, and a third layer ID to other applications. As such, the delivery system 10 may cause processing to be performed only if the condition specified in the distance condition is met. Note that the delivery information processing unit 84 determines whether a company code and a management code included in delivery information are a company code and a management code to be processed. If the company code and the management code included in the delivery information are the company code and the management code to be processed, the delivery information processing unit 84 may utilize the delivery information to perform processing. Determination on a target of processing may only be any one of a company code or a management code. A company code or a management code to be a target of processing may be preset or inputted from a screen or the like. With this, the delivery system 10 may cause processing to be performed only with delivery information of a specific company code and management code. For example, a different company code may be set to a shopping mall or a department store, a company code of a delivery source has more than one shop, and a different management code is assigned to each shop. In such a case, if the delivery information processing unit 84 sets matching of a company code and a management code as a condition, the delivery information processing unit 84 may cause processing to be performed only with delivery information delivered from a specific shop. On the other hand, if the delivery information processing unit 84 sets matching of company codes as a condition, the delivery information processing unit 84 may cause processing to be performed on delivery information delivered from all shops.

Flow of Processing

Figure 10A:
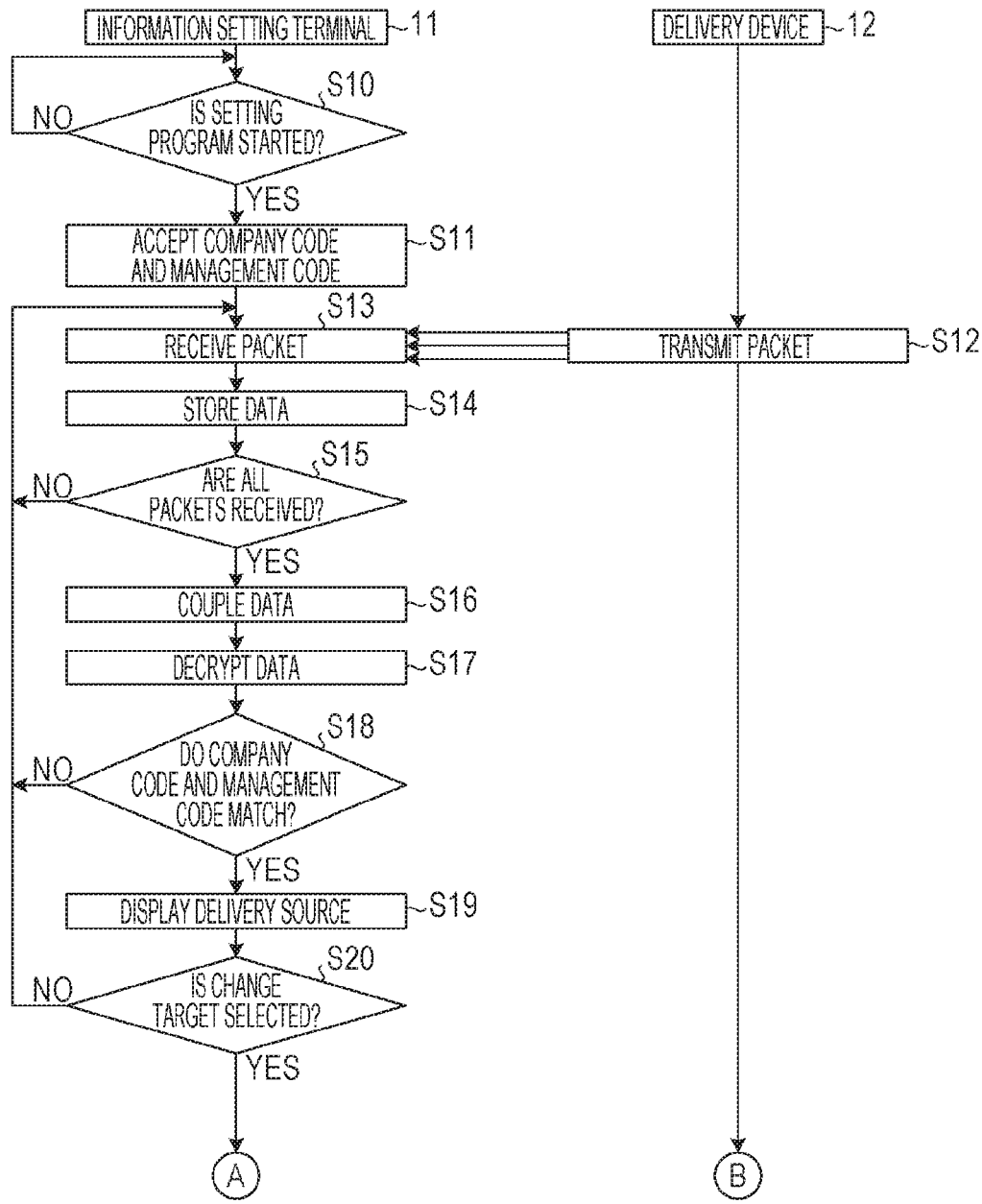
FIGS. 10A and 10B are sequence diagrams illustrating a flow of a setting process that sets delivery information.
Figure 10B:
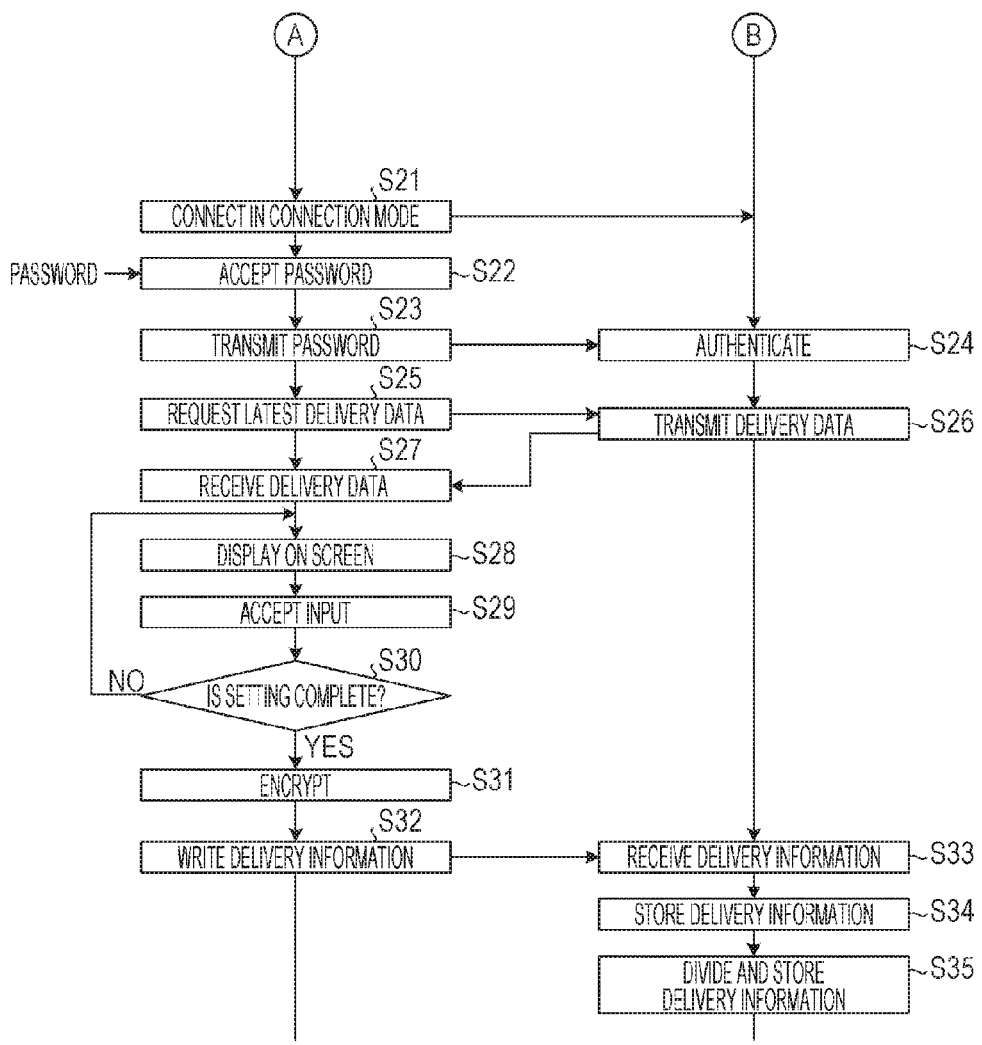

Flow of processing to be performed by the delivery system 10 according to example 1 is described. First, flow of setting delivery information for the delivery device 12 is described. FIGS. 10A and 10B show a sequence diagram illustrating flow of a setting process that sets delivery information. The information setting terminal 11 judges whether a setting program which sets delivery information is started (S10). When the setting program is started (S10 affirmative), the following processes are performed in the information setting terminal 11.

The acceptance unit 33 displays the company code and management code input screen 100 and accepts input of a company code and a management code (S11). The acceptance unit 33 stores the company code and the management code inputted from the company code and management code input screen 100 as a specified company code and a specified management code in the storage unit 23.

When the power is turned on, the delivery device 12 stars delivery of a packet in the advertise mode of BLE. When delivery information is not set, the delivery device 12 delivers a packet of Profile No: 00. On the other hand, when the delivery information is set, the delivery device 12 divides the delivery information by predetermined size transmittable per BLE packet and delivers the packets.

The reception unit 30 receives the packets delivered from the delivery device 12 by way of the wireless communication I/F unit 20 (S13). The reception unit 30 stores packet data together with a serial number and a sequence number included in the packets (S14). The coupling unit 31 judges for each serial number included in the packet whether packets of sequence numbers corresponding to the number of divisions are all received (S15). If all the packets are not received (S15 negative), processing shifts to S13 described above.

On the other hand, when all the packets are received (S15 affirmative), the coupling unit 31 integrates data in the "Data" area of the packet in the order of sequence numbers (S16). The decryption unit 32 decrypts the data coupled by the coupling unit 31 (S17).

The acceptance unit 33 judge whether a company code and a management code of restored data match the specified company code and the specified management code stored in the storage unit 23 (S18). When the company code and the management code do not match (S18 negative), processing shifts to S13 described above.

On the other hand, when the company code and the management code match (S18 affirmative), the acceptance unit 33 displays a terminal number of the delivery device 12 of the delivery source of the restored data on the display unit 21, and accepts selection of the change target delivery device 12 (S19).

The acceptance unit 33 judges whether or not the change target delivery device 12 is selected (S20). When the change target delivery device 12 is not selected (S20 negative), processing shifts to S13 described above.

On the other hand, when the change target delivery device 12 is selected (S20 affirmative), the transmission unit 35 connects to the change target delivery device 12 through connections in the connection mode of BLE (S21). The acceptance unit 33 displays the password input screen to accept input of a password (S22). The transmission unit 35 transmits the accepted password to the delivery device 12 (S23).

The delivery device 12 stores an authentication password in advance. The control unit 42 of the delivery device 12 performs authentication to see whether a password received from the information setting device 11 matches the authentication password (S24). In the example of FIG. 10A and FIG. 10B, the authentication is successful.

The acceptance unit 33 transmits a transmit request to acquire various types of latest information set in the change target delivery device 12 (S25). The delivery device 12 transmits the various types of information that is set (S26). For example, the delivery device 12 transmits information on all divided data 51, a control address, a distance condition, signal intensity, a packet transmission cycle, a packet switching cycle or the like. Note that the delivery device 12 may continuously transmit pieces of divided data 51 in packets of BLE, or integrate all the pieces of divided data 51 and transmit the data in one packet. The reception unit 30 receives the packets transmitted from the delivery device 12 by way of the wireless communication I/F unit 20 (S27).

The acceptance unit 33 displays various setting change screens to change settings of the change target delivery device 12 on the display unit 21 (S28). For example, the acceptance unit 33 displays the menu screen 110 from which each setting screen is displayed. Note that if received data is Profile No: 01, 02, 03, 04, 15, the Profile No: 01, 02, 03, 04, 15 are displayed as an initial value in the input column of each setting change screen using information decrypted by the decryption unit 32. The acceptance unit 33 accepts input from the input unit 22 (S29). For example, the acceptance unit 33 accepts input of delivery information, a management code, a control address, a distance condition, signal intensity, a packet transmission cycle, a packet switching cycle, or the like. The acceptance unit 33 judges whether the setting is complete by selecting Set button on any of each setting change screen (S30). When the setting is not complete (S30 negative), processing shifts to S28 described above. Here, setting of any of Profile No: 01, 02, 03, 04, 15 is changed.

On the other hand, when the setting is complete (S30 affirmative), the encryption unit 34 uses an encryption key to encrypt data of the changed profile and generate delivery information (S31). The transmission unit 35 transmits a packet with delivery information stored in the "Data" area and writes the delivery information in the delivery device 12 (S32).

The reception unit 60 receives a packet including delivery information from the delivery device 12 through communications in the connection mode of BLE from the information setting terminal 11 (S33). The reception unit 60 stores the delivery information include in the received packet as delivery information 50 in the storage unit 41 (S34). The division unit 61 divides the delivery information 50 by predetermined size transmittable per BLE packet and stores the information (S35). For example, the division 61 divides the delivery information to at most 15 pieces, each being 16 bytes, from the front side of the data and delivers the data.

The division unit 61 associates a sequence number identifying divided data 51 with each piece of the divided data 51 obtained by dividing the delivery information and stores the data in the storage unit 41. The division unit 61 also stores the number of divisions of the divided data in the storage unit 41.

Then, flow of delivering information and decrypting the delivered information is described hereinafter. FIG. 11 is a sequence diagram illustrating flow of a delivery process that delivers information and of a decryption process that decrypts delivered information. As illustrated in FIG. 11, when power of the delivery device 12 is turned on (S50), the delivery processing is started and subsequent processes are performed. On the other hand, the reception terminal 13 judges whether a reception program to receive delivered information is started (S51). In the reception terminal 13, when the reception program is started, subsequent processes are performed.

The delivery unit 62 sets 1 to a variable n (S52). A value of this variable n represents a sequence number. The delivery unit 62 judges whether or not the divided data 51 is stored in the storage unit 41 (S53). If the divided data 51 is stored (S53 affirmative), the delivery unit 62 sets the number of divisions of the divided data 51 to a variable N (S54). The delivery unit 62 generates a BLE packet that stores the divided data with $n^{th}$ sequence number in the "Data" area and the sequence number identifying the divided data 51 and the number of divisions in the "SEQ" area (S55).

On the other hand, when the divided data 51 is not stored (S53), the delivery unit 62 generates a BLE packet with "1/1" stored in the "SEQ" area (S56). For example, the delivery unit 62 generates a packet of Profile No: 00.

The delivery device 12 shifts to and wait in a sleep state till the delivery timing comes (S57 negative), and starts when the timing of packet transmission comes (S57 affirmative). When the delivery device 12 is started, the delivery unit 62 transmits the generated packet (S58).

The reception unit 80 of the reception terminal 13 receives a packet including divided data from the delivery device 12 by way of the wireless communication I/F unit 70 (S59). The reception unit 80 stores data of a packet together with a serial number and a sequence number included in the packet (S60). The coupling unit 81 judges for each serial number whether packets of sequence numbers corresponding to the number of divisions are all received (S61). When all packets are not received (S61 negative), processing shifts to S59 described above.

The delivery unit 62 judges whether timing to switch packets comes (S62). For example, if a period of time longer than a packet switching cycle elapses after packets were switched last time, the delivery unit 62 judges that the timing to switch packets comes. If the timing to switch packets does not come (S62 negative), processing shifts to S57. On the other hand, if the timing to switch packets comes (S62 affirmative), the delivery unit 62 adds 1 to a value of the variable n and updates the sequence number (S63). The delivery unit 62 judges whether a value of the variable n is larger than a value of the variable N (S64). When the value of the variable n is not larger than the value of the variable N (S64 negative), processing shifts to S53 described above. On the other hand, when the value of the variable n is larger than the value of the variable N (S64 affirmative), the delivery unit 62 sets 1 to the variable n (S65), and processing moves to S53 mentioned above.

On the other hand, when all packets are received (S61 affirmative), the coupling unit 81 couples the data in the "Data" area of the packet in the order of sequence numbers (S66). The decryption unit 82 decrypts the data coupled by the coupling unit 81 (S67).

The delivery information processing unit 84 judges whether a company code included in the decrypted delivery information matches a company code to be processed (S68). If the company code does not match (S68 negative), processing shifts to S59 described above.

If the company code matches (S68 affirmative), the estimation unit 83 estimates a distance from signal intensity when the packet for which the company code matches is received (S69). The delivery information processing unit 84 judges whether the distance estimated by the estimation unit 83 meets the condition in the "Distance Condition" of the received packet (S70). If the estimation unit 83 does not meet the condition (S70 negative), processing shifts to S59 described above.

On the other hand, if the estimation unit 83 meets the condition (S70 affirmative), the delivery information processing unit 84 divides the decrypted delivery information according to the format of the profile No (S71). The delivery information processing unit 84 utilizes the divided data to perform predetermined processing (S72).

Application Example

An example in which the delivery system according to this example is applied is described hereinafter. FIG. 12A is a diagram illustrating an example in which a delivery system is applied. FIG. 12A illustrates a case where beneficial information related to articles sold at a selling space of a shop such as a supermarket is delivered. In the example of FIG. 12A, a reception terminal 13 is provided on a shopping cart 200. In addition, in the case of FIG. 12A, a delivery device 12 is placed in a liquor section and the delivery device 12 delivers information on other articles. For example, the delivery device 12 uses the format of Profile No: 02 to deliver an URL of a Web page on which information on snacks to go with wine is introduced. When a customer moves the shopping cart 200 to come close to the liquor section, the reception terminal 13 receives the information delivered by the delivery device 12 and the Web page on which information on snacks to go with wine is introduced is displayed. In this manner, by delivering beneficial information related to articles to sell, the delivery system 10 may effectively promote sales to customers.

Figure 12B:
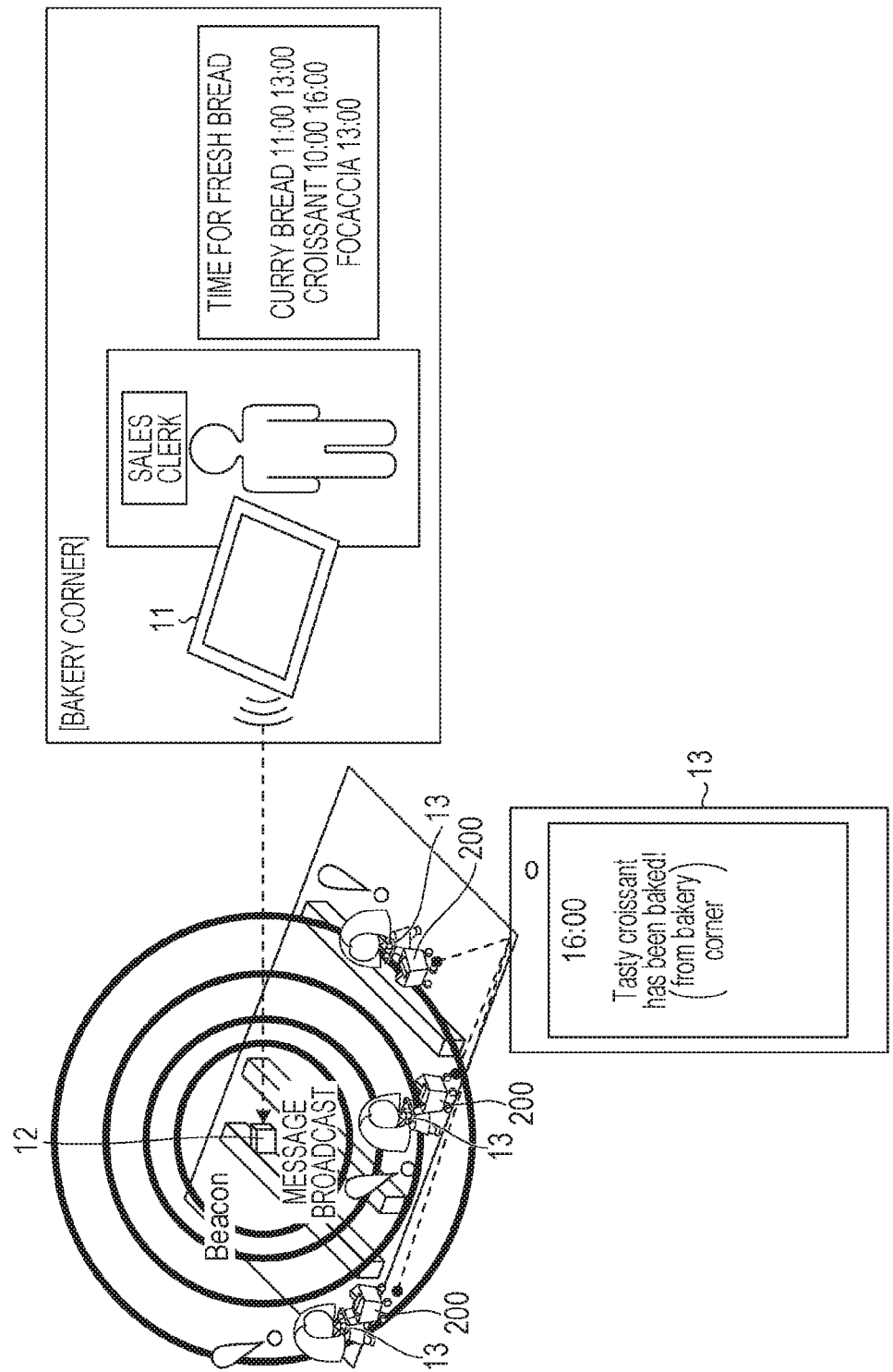
FIG. 12B is a diagram illustrating another example in which the delivery system is applied.

FIG. 12B is a diagram illustrating another example in which the delivery system is applied. FIG. 12B illustrates a case where beneficial information is delivered real time on a shopping space of a shop such as a supermarket. In the example of FIG. 12B, a reception terminal 13 is provided on a shopping cart 200. In addition, in the example of FIG. 12B, a delivery device 12 is placed on the shopping space of the shop. A sales clerk uses an information setting terminal 11 to set beneficial information real time to the delivery device 12 and delivers information from the delivery device 12. In the example of FIG. 12B, when a sales clerk sets baking time of bread, a message that bread is baked at the bakery section is delivered by using the format of Profile No: 03, corresponding to the baking time. The reception terminal 13 receives the information delivered by the delivery device 12 and the delivered message is displayed. In this manner, by delivering beneficial information real time, the delivery system 10 may effectively promote sales to customers.

Figure 12C:
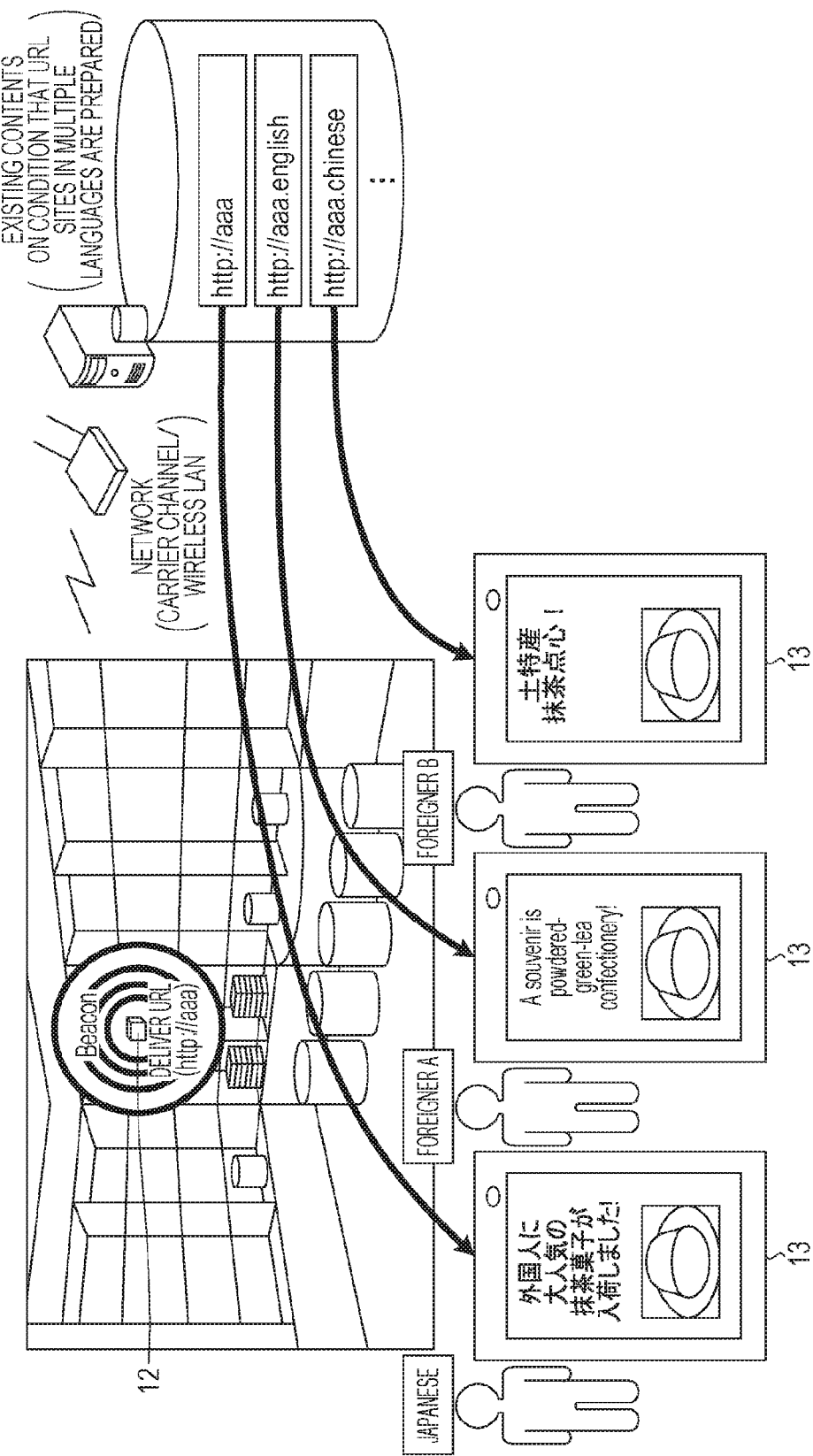
FIG. 12C is a diagram illustrating another example in which the delivery system is applied.

FIG. 12C is a diagram illustrating another example in which the delivery system is applied. FIG. 12C illustrates a case where beneficial information corresponding to customers is delivered at a souvenir section. In the example of FIG. 12C, an application supporting a delivery system 10 is installed in a smart phone owned by a customer to cause the smart phone to function as a reception terminal 13. The application may acquire a language used by the customer from OS settings or input the language in advance, as occasion calls. In the example of FIG. 12C, a Web page introducing information on articles is prepared in each language. As for the address configuration of Web pages in respective languages, an URL of a Web page in Japanese is used as a common URL, and a URL of a Web page in a foreign language is formed by adding an address corresponding to the foreign language to the common URL. For example, the Web page in Japanese has the URL as "http://aaa". The Web page in English has the URL as "http://aaa.english". The Web page in Chinese has the URL as "http://aaa.chinese". In addition, the address configuration may be such that the URL of the Web page in Japanese also has the common URL to which an address corresponding to the language is added. In the example of FIG. 12C, the delivery device 12 is placed in the souvenir section. The delivery device 12 delivers the common URL. In the example of FIG. 12C, the delivery device 12 delivers "http://aaa". The reception terminal 13 accesses the address to which address information corresponding to the language is added to display the Web page. In the example of FIG. 12C, the reception terminal 13 of a Japanese accesses to "http://aaa" and the Web page in Japanese is displayed. The reception terminal 13 of a foreigner A accesses to "http://aaa.english" and the Web page in English is displayed. The reception terminal 13 of a foreigner B accesses to "http://aaa.chinese" and the Web page in Chinese is displayed. In this manner, the delivery system 10 may deliver beneficial information in a language used by a customer by utilizing one URL delivered. In the example of FIG. 12C, same display content is displayed in the user terminals in all of Japanese, English, and Chinese.

FIG. 12D is a diagram illustrating another example in which the delivery system is applied. FIG. 12D illustrates a case where beneficial information corresponding to a customer is delivered at an information counter. In the example of FIG. 12D, an application supporting a delivery system 10 is installed in a smart phone owned by a customer to cause the smart phone to function as a reception terminal 13. The application may acquire a language used by the customer from OS settings or input the language in advance, as occasion calls. The application sets a management code depending on a language used by a customer. In the example of FIG. 12D, multiple delivery devices 12 are placed at the information counter. A sales clerk uses an information setting terminal 11 to set a management code corresponding to a language to set a message in each language in other delivery device 12. The reception terminal 13 buffers information received from the multiple delivery devices 12 couples and decrypts information for which a serial number of the delivery device 12 is same and in which all sequence numbers are found. The reception terminal 13 displays information, for which the management codes match, of delivered information. In the example of FIG. 12D, a message in Japanese is displayed in the reception terminal 13 of a Japanese. A message in English is displayed in the reception terminal 13 of a foreigner A. A message in Chinese is displayed in the reception terminal 13 of a foreigner B. In this manner, even when the multiple delivery devices 12 are placed, the delivery system 10 may deliver beneficial information corresponding to customers by using the management code. In addition, while the embodiment described above discloses a mechanism in which a management code is used to identify a delivery device 12 and a message to display is automatically selected, received information of the delivery devices 12 may be displayed in a list so that a customer may select. In the example of FIG. 12D, different contents are displayed in the respective languages on the reception terminals 13 of the respective users.

FIG. 12E is a diagram illustrating another example in which the delivery system is applied. FIG. 12E illustrates a case where information is delivered in an evacuation center. In the example of FIG. 12E, an application supporting a delivery system 10 is installed in a smart phone owned by an evacuee to cause the smart phone to function as a reception terminal 13. In the example of FIG. 12E, a delivery device 12 is placed in the evacuation center. Since the delivery device 12 may be operated with a battery or the like and has small power consumption, the delivery device 12 may deliver information for a long period of time even in a situation in which there is no power supply equipment. A municipal employee uses an information setting terminal 11 to set information to be delivered. For example, a schedule to distribute goods is delivered. The delivery device 12 continuously delivers the set information. When the information is delivered, the reception terminal 13 displays the delivered information. For example, when information is broadcasted, a person who is not around at the time of broadcasting may not obtain information. On the other hand, by the delivery device delivering information, the delivery system 10 is not limited by the timing of broadcasting and may make information well known to evacuees who evacuate to the evacuation center.

FIG. 12F is a diagram illustrating another example in which the delivery system is applied. In the example of FIG. 12F, a delivery device 12 is placed in a guestroom of a hotel. In the example of FIG. 12F, an application supporting a delivery system 10 is installed in a smart phone owned by a guest of a hotel to cause the smart phone to function as a reception terminal 13. The delivery device 12 uses the format of Profile No: 01 to deliver information related to settings of a wireless LAN and a URL of a hotel portal site. The reception terminal 13 sets the wireless LAN based on the delivered information, accesses to the URL, and displays the hotel portal site. With this, the guest may connect to the wireless LAN without setting the wireless LAN by himself or herself. In addition, the guest may obtain information for guests from the hotel portal site.

Figure 12G:
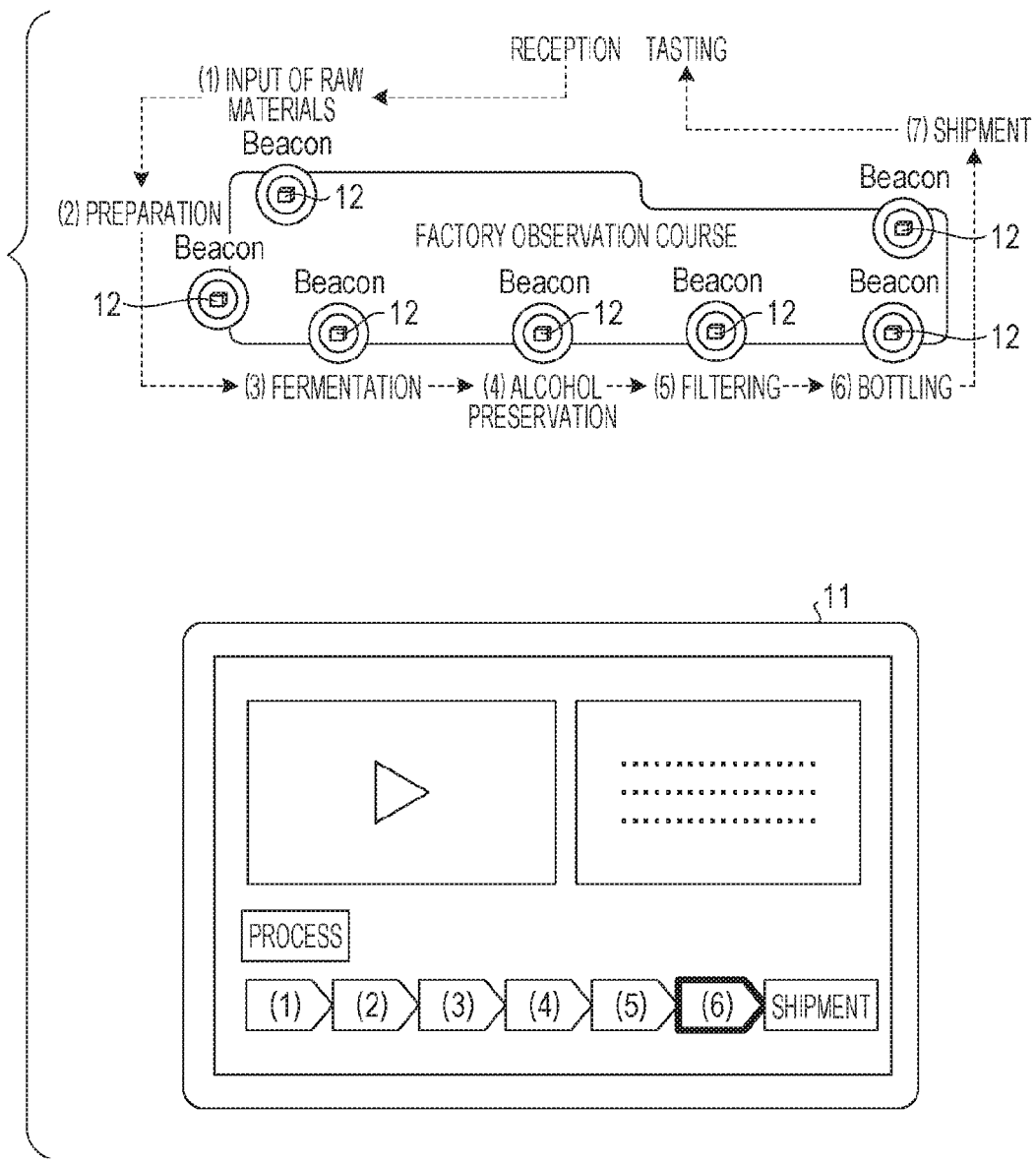
FIG. 12G is a diagram illustrating another example in which the delivery system is applied.

FIG. 12G is a diagram illustrating another example in which the delivery system is applied. FIG. 12G illustrates a case where valid information along a moving position is delivered. In the example of FIG. 12G, multiple delivery devices 12 are placed along a course of a factory tour. In the example of FIG. 12G, an application supporting a delivery system 10 is installed in a smart phone owned by a visitor to cause the smart phone to function as a reception terminal 13. As the visitor moves along the tour course and approaches the placed delivery device 12, a URL or a message corresponding to the location is delivered. This enables delivery of information corresponding to a location of a visitor. Note that the reception terminal 13 may be a dedicated terminal to be lent to a visitor.

Effects

As described above, in the delivery system 10 according to the embodiment, the information setting terminal 11 accepts delivery information that is delivered by the delivery device 12. The information setting terminal 11 transmits the delivery information to the delivery device 12. The delivery device 12 receives the transmitted delivery information. The delivery device 12 stores received delivery information in the storage unit 41. The delivery device 12 divides stored delivery information 50 to size deliver, and generates multiple pieces of divided data 51. The delivery device 12 sequentially selects and delivers the multiple pieces of divided data 51. The reception terminal 13 receives the multiple pieces of divided data. The reception terminal 13 couples the multiple pieces of divided data to generate delivery information. This allows the delivery system 10 to directly provide usable information without being provided with a management server.

In addition, the information setting terminal 11 acquires an identifier to identify the delivery device 12. The information setting terminal 11 uses the acquired identifier to encrypt delivery information to be transmitted. The delivery device 12 delivers separates the identifier identifying the delivery device 12 from the received information. The reception terminal 13 uses the separated identifier to decrypt the generated delivery information. With this, the delivery system 10 may encrypt delivery information using a different encryption key for each delivery device, and only the reception terminal 13 that receives the delivery information may restore the delivery information alone.

In addition, the information setting terminal 11 converts delivery information to information with size equal to an integral multiple of delivery size the delivery information. With this, the delivery system 10 may divide the delivery information by the delivery size, and may make the sizes of packets to be delivered identical. In addition, when the predetermined size is set equal to 16 bytes which are of a processing unit of the AES encryption, efficient delivery of information is enabled.

In addition, the information setting terminal 11 further accepts settings of a target range based on a distance from the delivery device 12. The information setting terminal 11 adds range information indicating the target range to the delivery information and transmits the information. The reception terminal 13 estimates a distance from signal intensity of received pieces of divided information. When the estimated distance is in a target range indicated by the range information added to the coupled delivery information, the reception terminal 13 performs a process using the delivery information. With this, the delivery system 10 may cause processing using restored information to be performed only when the range from the delivery device 12 is in the target range indicated by the range information.

In addition, the information setting terminal 11 further accepts input of signal intensity at a predetermined distance from the delivery device 12. The information setting terminal 11 adds a threshold indicating the accepted signal intensity to the delivery information and transmits the information. The reception terminal 13 uses the threshold added to the coupled delivery information to estimate a distance from the signal intensity of the pieces of divided information. This enables the delivery system 10 to estimate a predetermined distance from the delivery device 12 with precision.

In addition, the information setting terminal 11 accepts input of any one type of delivery information of multiple types. The information setting terminal 11 adds profile information indicating a type of delivery information to the delivery information and transmits the information. This enables the information system to determine from the profile information what type of information the delivery information is.

Embodiment 2

Although so far the embodiments of the disclosed devices have been described, the disclosed technique may be implemented in a variety of different forms in addition to the embodiment described above. Now, other embodiments included in the disclosure are described hereinafter.

For example, in the above embodiment, the case where the information setting terminal 11 displays the delivery device 12 that delivers information or which both the company code and the management code match to selectively perform setting is described. However, the disclosed device is not limited to this example. For example, the information setting terminal 11 may display the delivery device 12 that delivers information for which company codes match to selectively perform setting.

In addition, in the above embodiment, the case where the delivery device 12 stores in the storage unit 41 the delivery information 50 and the divided data 51 obtained by dividing the delivery information 50 is described. However, the disclosed device is not limited to this example. For example, the delivery device 12 stores only the delivery information 50 in the storage unit 41 and reads data, which is part of the data of the delivery information 50, when delivering to generate a packet. More specifically, the delivery unit 62 divides the delivery information 50 to parts that is of predetermined size and transmitted in one packet, and switches read target parts in sequence for every switching cycle. Then, the delivery unit 62 may read the read target part for every transmission cycle to generate and deliver a packet. In addition, for example, the delivery device 12 may store only the divided data 51 obtained by dividing the delivery information 50 in the storage unit 41 and read the divided data 51 in sequence to generate a packet.

In addition, in the above embodiment, the case where the information setting terminal 11 writes delivery information in the delivery device 12 is described. However, the disclosed device is not limited to this example. For example, delivery information may be written from an information setting device to the delivery device 12 by way of a public circuit, an Internet, a LAN, a WAN, or the like.

In addition, each component of each device illustrated is functionally conceptual, and not desirable to be physically configured as the illustration. More specifically, a specific state of distribution and integration of each device is not limited to the illustrated state, and all or some of the devices may be functionally or physically distributed and integrated in terms of any unit, depending on various loads or usage status. For example, the processing unit of the reception unit 30, the coupling unit 31, the decryption unit 32, the acceptance unit 33, the encryption unit 34, and the transmission unit 35 may be integrated appropriately. In addition, for example, each processing unit of the reception unit 60, the division unit 61, and the delivery unit 62 may be integrated appropriately. In addition, for example, each processing unit of the reception unit 80, the coupling unit 81, the decryption unit 82, the estimation unit 83, and the delivery information processing unit 84 may be integrated appropriately. In addition, processing of each processing unit the information setting terminal 11, the delivery device 12, and the reception terminal 13 may be appropriately integrated so that the processing is appropriately separated to multiple processes of multiple processing units. In addition, some or all of respective process functions performed by respective processing units may be implemented by a CPU and a program that is analyzed and executed by the CPU, or may be implemented as hardware based on a wired logic.

Setting Program

Figure 13A:
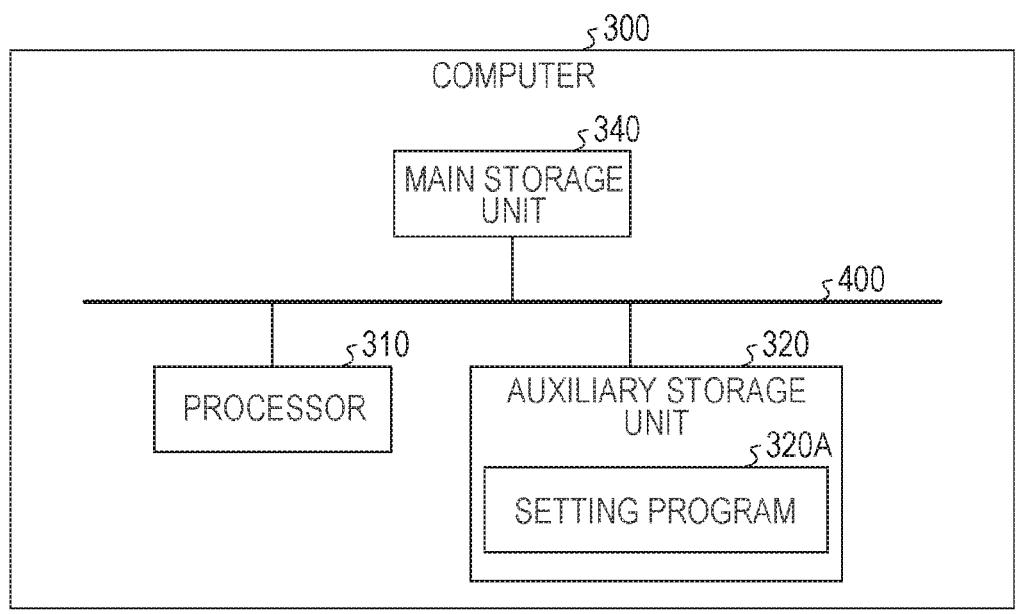
FIG. 13A is a diagram illustrating an example of a computer configured to execute a setting program.

In addition, various processes described in the above embodiment may be implemented by performing a program prepared in advance in a smart phone or a tablet terminal or a computer system such as a personal computer or a work station. Then, an example of a computer system that performs a program having functions similar to the above embodiment is described hereinafter. First, a setting program that sets information to a delivery device 12 is described. FIG. 13A is a diagram illustrating an example of a computer configured to execute a setting program.

As illustrated in FIG. 13A, a computer 300 has a processor 310, an auxiliary storage unit 320, and a main storage unit 340. These units 300 to 340 are connected by way of a bus 400. The processor 310 is, for example, an electronic circuit such as a CPU or an integrated circuit such as an ASIC. The auxiliary storage unit 320 is, for example, a semiconductor memory capable of rewriting data, such as a flash memory, or a storage device such as an SSD, HHD, or the like. The main storage unit 340 is a semiconductor memory capable of rewriting data, such as a RAM, a flash memory, or the like.

In the auxiliary storage unit 320 is stored a setting program 320A that fulfills functions similar to the reception unit 30, the coupling unit 31, the decryption unit 32, the acceptance unit 33, the encryption unit 34, and the transmission unit 35 as described above. In addition, the setting program 320A may be separated appropriately.

The auxiliary storage unit 320 stores various types of information. For example, the auxiliary storage unit 320 stores an OS or various types of data used in various processes.

Then, the processor 310 reads and executes the setting program 320A from the auxiliary storage unit 320 to the main storage unit 340, thereby performing similar operations to each processing unit of the embodiment. More specifically, the setting program 320A performs similar operations to the reception unit 30, the coupling unit 31, the decryption unit 32, the acceptance unit 33, the encryption unit 34, and the transmission unit 35.

Note that the above-mentioned setting program 320A is not desirable to be stored in the auxiliary storage unit 320 from the beginning.

Delivery Program

Figure 13B:
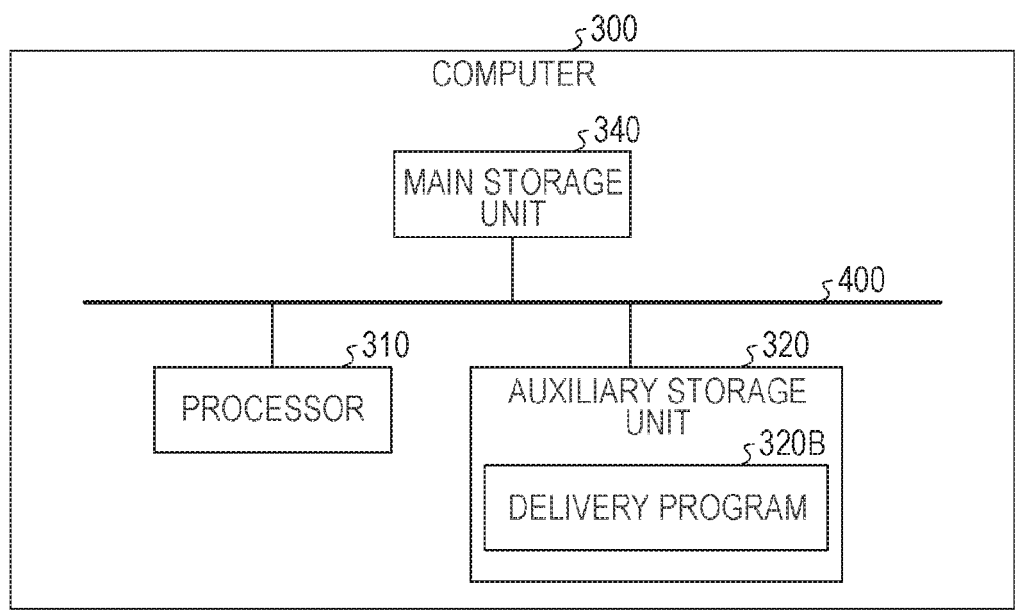
FIG. 13B is a diagram illustrating an example of a computer configured to execute a delivery program.

A delivery program to set information is described hereinafter. FIG. 13B is a diagram illustrating one example of a computer that executes the delivery program. Note that identical symbols are assigned to parts identical to FIG. 13A and a description is omitted.

As illustrated in FIG. 13B, in the auxiliary storage unit 320 is stored a delivery program 320B that fulfills similar functions to the reception unit 60, the division unit 61, and the delivery unit 62 described above. Note that the delivery program 320B may be separated appropriately.

In addition, the auxiliary storage unit 320 stores various types of information. For example, the auxiliary storage unit 320 stores an OS or various types of data used in various processes.

Then, the processor 310 reads and executes the delivery program 320B from the auxiliary storage unit 320, thereby performing similar functions to various processing units of the embodiment. More specifically, the delivery program 320B performs similar operations as the reception unit 60, the division unit 61, and the delivery unit 62.

Note that the above-mentioned delivery program 320B is not typically desirable to be stored in the auxiliary storage unit 320 from the beginning.

Decoding Program

Figure 13C:
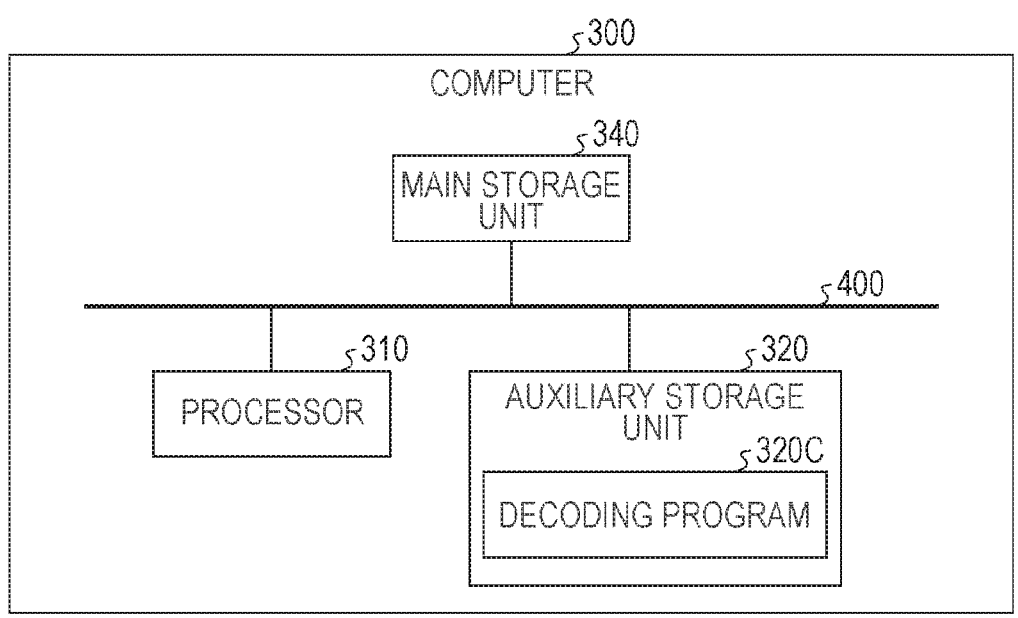
FIG. 13C is a diagram illustrating an example of a computer configured to execute an encoding program.

A decoding program to set information is described hereinafter. FIG. 13C is a diagram illustrating an example of a computer configured to execute an decoding program. Note that identical symbols are assigned to parts identical to FIG. 13A and a description is omitted.

As illustrated in FIG. 13C, in the auxiliary storage unit 320 is stored a decoding program 320C that fulfills similar functions to the reception unit 80, the coupling unit 81, the decryption unit 82, the estimation unit 83, and the delivery information processing unit 84 described above. Note that the decoding program 320C may be separated appropriately.

In addition, the auxiliary storage unit 320 stores various types of information. For example, the auxiliary storage unit 320 stores an OS or various types of data used in various processes.

Then, the processor 310 reads and executes the decoding program 320C from the auxiliary storage unit 320 to the main storage unit 340, thereby performing similar operations to each processing unit of the embodiment. More specifically, the decoding program 320C performs similar operations to the reception unit 80, the coupling unit 81, the decryption unit 82, the estimation unit 83, and the delivery information processing unit 84.

Note that the above-mentioned decoding program 320C is not desirable to be stored in the auxiliary storage unit 320 from the beginning, either.

In addition, for the setting program 320A, the delivery program 320B, and the decoding program 320C, the program may be stored in a "portable physical medium" that may be read by the computer 300, such as a CD-ROM, a DVD disk, an magneto-optic disk, an IC card. Then, the computer 300 may read from these and execute the program.

Furthermore, the program may be stored in "other computer (or server)" connected to the computer 300 by way of a public circuit, Internet, a LAN, a WAN or the like. Then, the computer 300 may read from these and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A delivery system comprising:
    a first terminal device; and
    a delivery device, wherein
    the delivery device includes
        a first memory; and
        a first processor coupled to the first memory, the first processor being configured to:
            set a sequence number;
            divide delivery information by delivery size to generate a plurality of pieces of divided data and set a number of divisions of the divided information; and
            generate a packet including the divided data, the sequence number, and the number of divisions and transmit the packet to the first terminal device, and the first terminal device includes
a second memory; and
a second processor coupled to the second memory, the second processor being configured to:
receive the packet;
store, in the second memory, the data of the packet together with an identifier identifying the delivery device and the sequence number included in the packet;
judge, for each identifier, whether packets of sequence numbers corresponding to the number of divisions are all received;
when all the packets are received, couple the divided data of the packets in an order of the sequence numbers;
decrypt the coupled data;
judge whether a code included in the decrypted data matches a code to be processed;
in a case in which the code included in the decrypted data matches the code to be processed, estimate a distance from signal intensity when a packet for which the code matches is received;
judge whether the estimated distance meets a predetermined condition; and
in a case in which the estimated distance meets the predetermined condition, divide the decrypted data according to a profile of the delivery information to perform a predetermined processing.

2. The delivery system according to claim 1, further comprising a second terminal device, wherein
the second terminal device includes
a third memory; and
a third processor coupled to the third memory, the third processor being configured to:
accept delivery information to be delivered by the delivery device; and
transmit the delivery information to the delivery device,
the first processor is configured to:
receive the transmitted delivery information;
store the received delivery information; and
divide the stored delivery information by the delivery size.

3. The delivery system according to claim 2, wherein
the third processor is configured to:
acquire the identifier identifying the delivery device; and
use the acquired identifier to encrypt the delivery information to be transmitted,
the delivery unit of the delivery device transmits the pieces of divided information including the identifier identifying the delivery device,
the first terminal device includes:
a separation unit configured to separate the identifier identifying the delivery device from the information received by the reception unit; and
a decryption unit configured to use the separated identifier to decrypt the delivery information generated by the coupling unit.

4. The delivery system according to claim 3, wherein
the third processor is configured to convert the delivery information to information with size equal to an integral multiple of the delivery size.

5. The delivery system according to claim 2, wherein
the third processor is configured to:
accept setting of a target range based on a distance from the delivery device; and add range information indicating the target range to the delivery information and transmit the resultant delivery information, and
the second processor is configured to:
perform processing using the delivery information when the estimated distance is in the target range indicated by the range information added to the coupled delivery information.

6. The delivery system according to claim 5, wherein
the third processor is configured to:
accept input of signal intensity at a predetermined distance from the delivery device,
add a threshold indicating the signal intensity to the delivery information and transmit the resultant delivery information, and
use the threshold added to the coupled delivery information to estimate the distance from the signal intensity of the pieces of divided information.

7. The delivery system according to claim 2, wherein
the third processor is configured to:
accept input of any one of a plurality of types of delivery information, and
add profile information indicating the type of the delivery information to the delivery information and transmit the resultant delivery information.

8. A delivery method by a first terminal device and a delivery device, the method comprising:
setting, by the delivery device, a sequence number;
dividing, by the delivery device, delivery information by delivery size to generate a plurality of pieces of divided data and setting a number of divisions of the divided information;
generating, by the delivery device, a packet including the divided data, the sequence number, and the number of divisions and transmitting the packet to the first terminal device;
receiving, by the first terminal device, the packet;
storing, by the first terminal device, the data of the packet together with an identifier identifying the delivery device and the sequence number included in the packet;
judging, by the first terminal device, for each identifier, whether packets of sequence numbers corresponding to the number of divisions are all received;
when all the packets are received, coupling, by the first terminal device, the divided data of the packets in an order of the sequence numbers;
decrypting, by the first terminal device, the coupled data;
judging, by the first terminal device, whether a code included in the decrypted data matches a code to be processed;
in a case in which the code included in the decrypted data matches the code to be processed, estimating, by the first terminal device, a distance from signal intensity when a packet for which the code matches is received;
judging, by the first terminal device, whether the estimated distance meets a predetermined condition; and
in a case in which the estimated distance meets the predetermined condition, dividing, by the first terminal device, the decrypted data according to a profile of the delivery information to perform a predetermined processing.

9. The delivery method according to claim 8, by the first terminal device, a second terminal device, and the delivery device, the method comprising causing the second terminal device to accept input related to the delivery information to be delivered by the delivery device, and transmit the delivery information to the delivery device; and causing the delivery device to receive the transmitted delivery information, store the received delivery information, and divide the stored delivery information by the delivery size to generate the plurality of pieces of divided information.

10. A non-transitory computer-readable storage medium that stores a delivery program causing a computer to perform processes to:

set a sequence number, divide delivery information by delivery size to generate a plurality of pieces of divided data and set a number of divisions of the divided information, generate a packet including the divided data, the sequence number, and the number of divisions and transmit the packet to a terminal device, cause the terminal device to receive the packet, cause the terminal device to store the data of the packet together with an identifier identifying the delivery device and the sequence number included in the packet cause the terminal device to judge, for each identifier, whether packets of sequence numbers corresponding to the number of divisions are all received, when all the packets are received, cause the terminal device to couple the divided data of the packets in an order of the sequence numbers, cause the terminal device to decrypt the coupled data, cause the terminal device to judge whether a code included in the decrypted data matches a code to be processed, in a case in which the code included in the decrypted data matches the code to be processed, cause the terminal device to estimate a distance from signal intensity when a packet for which the code matches is received, cause the terminal device to judge whether the estimated distance meets a predetermined condition, and in a case in which the estimated distance meets the predetermined condition, cause the terminal device to divide the decrypted data according to a profile of the delivery information to perform a predetermined processing.

* * * * *